United States Patent [19]

Searcy, II et al.

[11] Patent Number: 5,528,721
[45] Date of Patent: Jun. 18, 1996

[54] DIRECT CURRENT MOTOR SPEED CONTROL APPARATUS

[75] Inventors: John V. Searcy, II, Spring; James D. Anderson, San Antonio, both of Tex.

[73] Assignee: John Svoboda

[21] Appl. No.: 250,920

[22] Filed: May 31, 1994

Related U.S. Application Data

[63] Continuation-in-part of Ser. No. 878,342, May 4, 1992, Pat. No. 5,317,669.

[51] Int. Cl.⁶ .................................................. H02P 5/168
[52] U.S. Cl. .......................... 388/824; 388/81; 388/827; 388/829; 388/840
[58] Field of Search ........................... 388/825–829, 388/830–831, 804, 811, 910, 838, 840, 824; 318/135–139, 9–14

[56] References Cited

U.S. PATENT DOCUMENTS

| | | | |
|---|---|---|---|
| 3,833,845 | 9/1974 | Smallbone et al. | 388/840 X |
| 3,878,449 | 4/1975 | Wilhelmi et al. | |
| 3,908,100 | 9/1975 | Richard et al. | 388/840 X |
| 4,355,268 | 10/1982 | Iwasawa et al. | 388/820 |
| 4,626,750 | 12/1986 | Post | 318/139 |
| 4,841,165 | 6/1989 | Bowles | 388/829 X |
| 4,871,952 | 10/1989 | Ishizaka et al. | 388/829 |
| 5,309,079 | 5/1994 | Takada | 388/811 X |
| 5,317,669 | 5/1994 | Anderson et al. | 388/840 X |

*Primary Examiner*—David S. Martin
*Attorney, Agent, or Firm*—Donald R. Comuzzi; Christopher L. Makay

[57] ABSTRACT

A DC motor control system reduces power demands imposed upon a DC power source energizing a utilizing device by varying the time during which power application occurs, but not the magnitude of the power which remains constant. The DC motor control system includes a transducer/resistor network, a trigger pulse circuit, a control signal circuit, a driver circuit, and a switch network. The control signal circuit outputs a duty cycle control signal as regulated by the transducer/resistor network and the trigger pulse circuit. The transducer/resistor network permits an operator to determine the duration of the duty cycle control signal, which varies from 0% to 100%, while the trigger pulse circuit establishes the frequency of the duty cycle control signal. The driver circuit receives and amplifies each duty cycle control signal outputted by the control signal circuit. The driver circuit inputs each amplified duty cycle control signal into the switch network to activate it. The activation of the switch network completes a current path from the DC power source to the utilizing device so that the DC power source energizes the utilizing device for the duration of each duty cycle control signal.

2 Claims, 7 Drawing Sheets

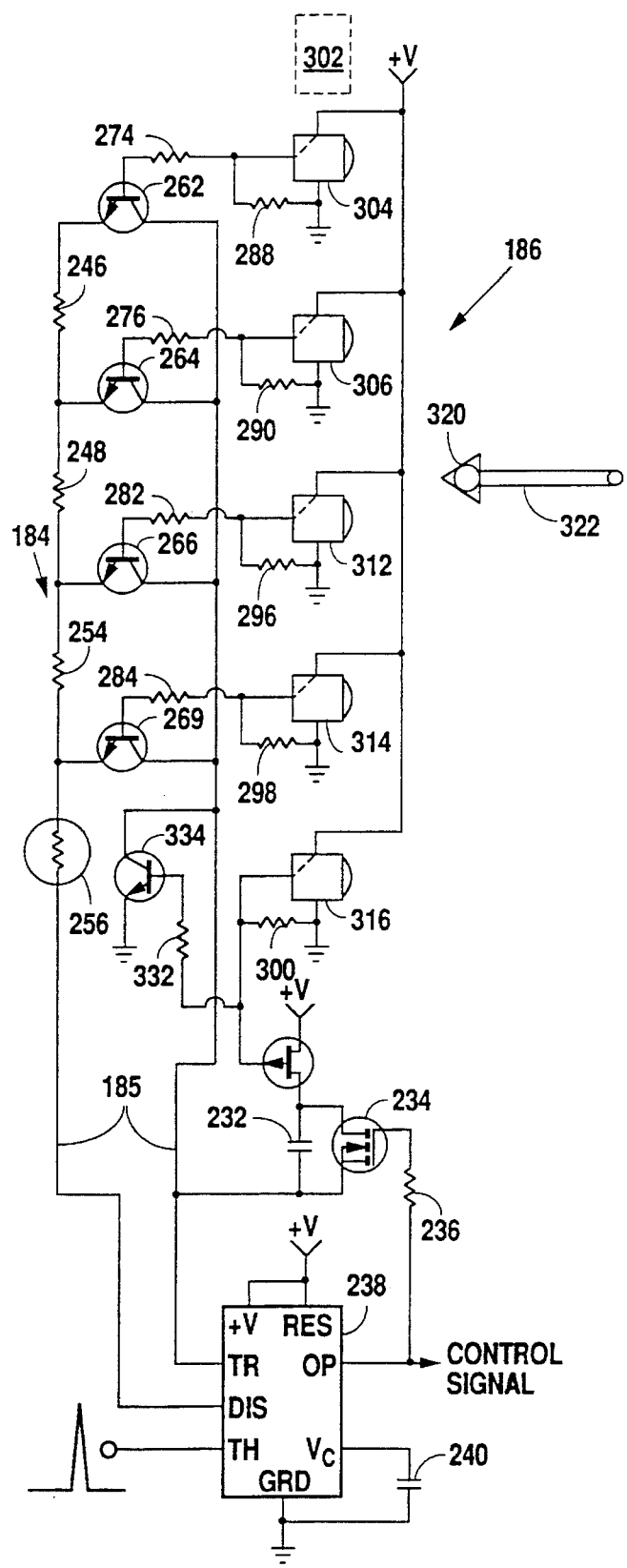
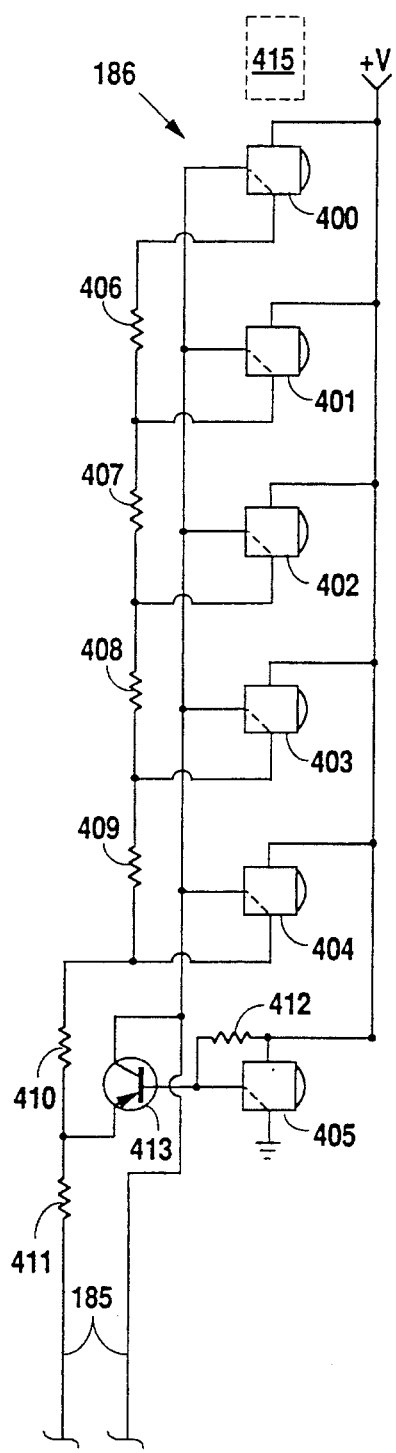
Fig. 3
Fig. 4

DIRECT CURRENT MOTOR SPEED CONTROL APPARATUS

This is a continuation in part of 07/878,342, now U.S. Pat. No. 5,317,669, filed May 4, 1992.

BACKGROUND OF THE INVENTION

The present invention relates to an electronic control circuit to provide efficient operation of direct current devices. More particularly, but not by way of limitation, the present invention is described herein as a control system for regulating the speed of DC motors used in electric powered vehicles.

DESCRIPTION OF THE RELATED ART

Originally, DC motor speed control was effected utilizing resistor banks placed in series with the motor. During operation, the resistor banks are switched in and out in response to a motor speed signal. Although that method is simple in concept and easy to implement, it is extremely inefficient because a portion of the power drawn from the power source is dissipated in the resistors and is wasted except at maximum motor speed. That occurs because the resistor banks may regulate the amount of power actually delivered to the motor and, therefore, motor speed, but they do nothing to alleviate the overall system load experienced by the DC battery. Thus, even though the resistor banks effectively control motor speed, they are extremely inefficient because any power not delivered to the motor is wasted as heat.

Improved systems employ silicon controlled rectifiers (SCR's) as current chopper control devices. Such systems provide a periodic on/off control that modifies the power to the drive motor and, thus, the resultant speed by variation of the "on-time" intervals. In that manner, the duty cycle (percent on-time) is adjusted. Although SCR systems are fairly effective, they are expensive, heavy, bulky, inefficient, generate excessive heat, and have poor load sharing characteristics when connected in parallel to serve large loads.

A more effective method of controlling the on/off cycle of power delivered to the motor is by using a power MOSFET (metal oxide semiconductor field effect transistor) network in place of the SCR's. A power MOSFET network is substituted for the SCR's because it takes up less space, is lighter, and is more energy efficient. One such system is U.S. Pat. No. 4,626,750 issued to Post. Post employs a power MOSFET network used as high-speed switches to deliver power to a motor using a periodic on/off cycle generated in response to an operator input. Post inputs an operator signal to a variable resistance to generate a signal representative of desired vehicle speed, and then compares that signal to a reference signal in order to determine the on/off cycle of conduction for the power MOSFET network. For example, at full speed, the power MOSFETS will conduct 100% of the time while at half speed, the power MOSFETS will conduct at approximately a 50% duty cycle. In that manner, significant improvement can be realized in battery life because with the exception of full speed, delivery of power to the motor occurs in varying durations at a fixed frequency.

Another advantage of the power MOSFET network is that it provides extremely fast switching times and allows operation at frequencies above the range of human hearing so that annoying audible tones are eliminated. However, operation at high frequencies creates voltage spikes as the power MOSFETS are switched on and off. These spikes must be suppressed to avoid component stress and degradation in overall efficiency.

A disadvantage of the Post system is the method used for voltage spike suppression. Post employs power diodes distributed through the power MOSFET network to provide for the voltage spike suppression. These diodes produce excessive heat which must be dissipated utilizing a heat sink. Unfortunately, the heat sink is also shared by the power MOSFET network and, additionally, acts as the conductor for the entire motor power control circuit. That configuration is extremely inefficient because the heat added by the diodes increases the resistance in the heat sink, thereby, inhibiting the current delivered to the motor.

A second disadvantage of the Post system is the use of two MOSFETs as switches to deliver the on/off signal to the power MOSFET network (see FIG. 5, numerals 178 and 180). During the on cycle, MOSFET 178 turns on to deliver voltage across the gates of each power MOSFET of the network, thus, turning them on. During the off portion of the cycle, MOSFET 178 turns off and MOSFET 180 turns on to ensure that the power MOSFET network is turned off. However, when MOSFET 180 is on, a path exists from +14 volts through resistors 212 and 210, diode 216, MOSFET 180, and resistor 190. Thus, a positive voltage exists across MOSFET 180 and resistor 190. That voltage also appears on the gates of the power MOSFET network. As a result, the MOSFETs are not completely turned off during the off portion of the cycle allowing a residual current flow through the MOSFETs and the motor. That current drain seriously reduces system efficiency, thereby degrading system operation and performance.

The off portion of the cycle occurs anytime the vehicle is not at full speed and includes when the vehicle is at rest without the key turned off. Only when the key is turned off will there be no off portion of the cycle. Most electric powered vehicles are simply turned on using the key and left on during the entire operating time. Thus, when a vehicle employing the Post system is operating at anything less than full speed, or more importantly, at rest, the path through MOSFET 180 will cause power to be lost.

In addition, a leakage path exists that drains battery power even with the key turned off. Referring to FIG. 1 of the Post patent, that path travels from battery 10, through resistor 104 and connection 34, across bottom electrode 26 to connection 37 and 126, and to control circuit 64. Further, referring to FIG. 5, connection 126 connects to the non-inverting input of comparator amplifiers 224 and 236 through a resistor. A problem occurs because a second resistor connects the non-inverting inputs of comparator amplifiers 224 and 236 to ground. These paths bypass key switch 100 and provides a current path to ground even when the key is off. Thus, both the constant drain along with the incomplete turn off of the power MOSFET network severely limits the battery's useful life between charges, and defeats the entire purpose of the Post system.

Accordingly, the present invention has been developed to eliminate the above problems. First, the present invention uses a separate heat sink and conductor components to provide an external and separate diode circuit which eliminates large voltage spikes without generating excessive heat. That diode circuit is composed of large capacity Schottky design switching diodes with a rate of change of 10,000 volts/microsecond and with very good load sharing characteristics necessary for voltage suppression without adding heat to the assembly. Second, the present invention has eliminated the MOSFET switches as a means to turn on and off the power MOSFET network to produce conduction and non-conduction. Finally, the leakage paths that unnecessarily drain the power source have been eliminated. The present invention, therefore, provides a design which is much simpler than conventional systems while delivering increased performance and extending battery charge life.

SUMMARY OF THE INVENTION

In accordance with the DC Motor Control System, a signal generation unit and a power control unit regulate the delivery of power to direct current devices such as DC electric motors operated to propel electric vehicles. The signal generation unit includes a transducer/resistor network and a trigger pulse circuit to regulate the output from a control signal circuit. The output from the control signal circuit provides a duty cycle control signal for the power control unit.

The signal generation unit includes the trigger pulse circuit to establish the frequency of the duty cycle control signal output from the control signal circuit. The trigger pulse circuit establishes the frequency of the duty cycle control signal through the output of a train of short duration positive trigger pulses to the control signal circuit. Each trigger pulse received by the control signal circuit triggers the control signal circuit off, resulting in the frequency of the duty cycle control signal corresponding to the frequency of the pulses.

The signal generation unit includes the transducer/resistor network to permit an operator to establish the duration of the duty The operator manipulates the cycle control signal. transducer/resistor network through an accelerator to vary the resistance of the transducer/resistor network and, thus, the resistance connected to the control signal circuit. The resistance of the transducer/resistor network determines the duration of the duty cycle control signal by establishing the point between trigger pulses where the control signal circuit triggers on. The transducer/resistor network establishes the triggering on point of the control signal circuit such that the control signal circuit outputs a duty cycle control signal having a duration from 0% to 100% of the time period between each trigger pulse.

The power control unit includes a driver circuit to receive and amplify each duty cycle control signal outputted by the control signal circuit. The driver circuit inputs each amplified duty cycle control signal into a switch network to activate the switch network for the duration of each duty cycle control signal. The activation of the switch network completes a current path from a battery or bank of batteries to the motor so that the battery or bank of batteries delivers power to the motor for the duration of each duty cycle control signal.

The power control unit further includes a regulator circuit, a noise suppression circuit, a current limiting circuit, an operational safety circuit, and a braking circuit. The regulator circuit conditions the battery voltage to provide a reliable and constant lower level source of power for the power control unit and the signal generation unit. The noise suppression circuit filters noise resulting from the rapid switching on and off of the switch network. The current limiting circuit prevents excess current conditions from damaging the DC Motor Control System and the motor. The operational safety circuit prevents either intentional or negligent abuse of the motor and the battery or bank of batteries supplying power to the motor. The braking circuit negates the potentially dangerous situation created when an operator reverses the direction of the motor with power already applied.

The signal generation unit further includes a conditioning circuit, a start safety circuit, and a limit circuit. The conditioning circuit provides the trigger pulse generation circuit with a conditioned supply voltage. The start safety circuit prevents an operator from controlling the delivery of power to the motor if the operator attempts to turn on the motor with the accelerator already depressed. The limit circuit assumes control of the delivery of power to the motor in the event one of current limiting circuit, operational safety circuit, braking circuit, and start safety circuit senses an abnormal operating condition or an operator abuse.

It is, therefore, an object of the present invention to provide a DC Motor Control System that utilizes a pulse train duty cycle control signal to regulate the delivery of power to a DC motor.

BRIEF DESCRIPTION OF THE DRAWINGS

FIG. 3 is a schematic diagram illustrating a first alternative embodiment of the transducer/resistor network of the DC Motor Control System.

FIG. 4 is a schematic diagram illustrating a second alternative embodiment of the transducer/resistor network of the DC Motor Control System.

DETAILED DESCRIPTION OF THE PREFERRED EMBODIMENT

Figure 1A:
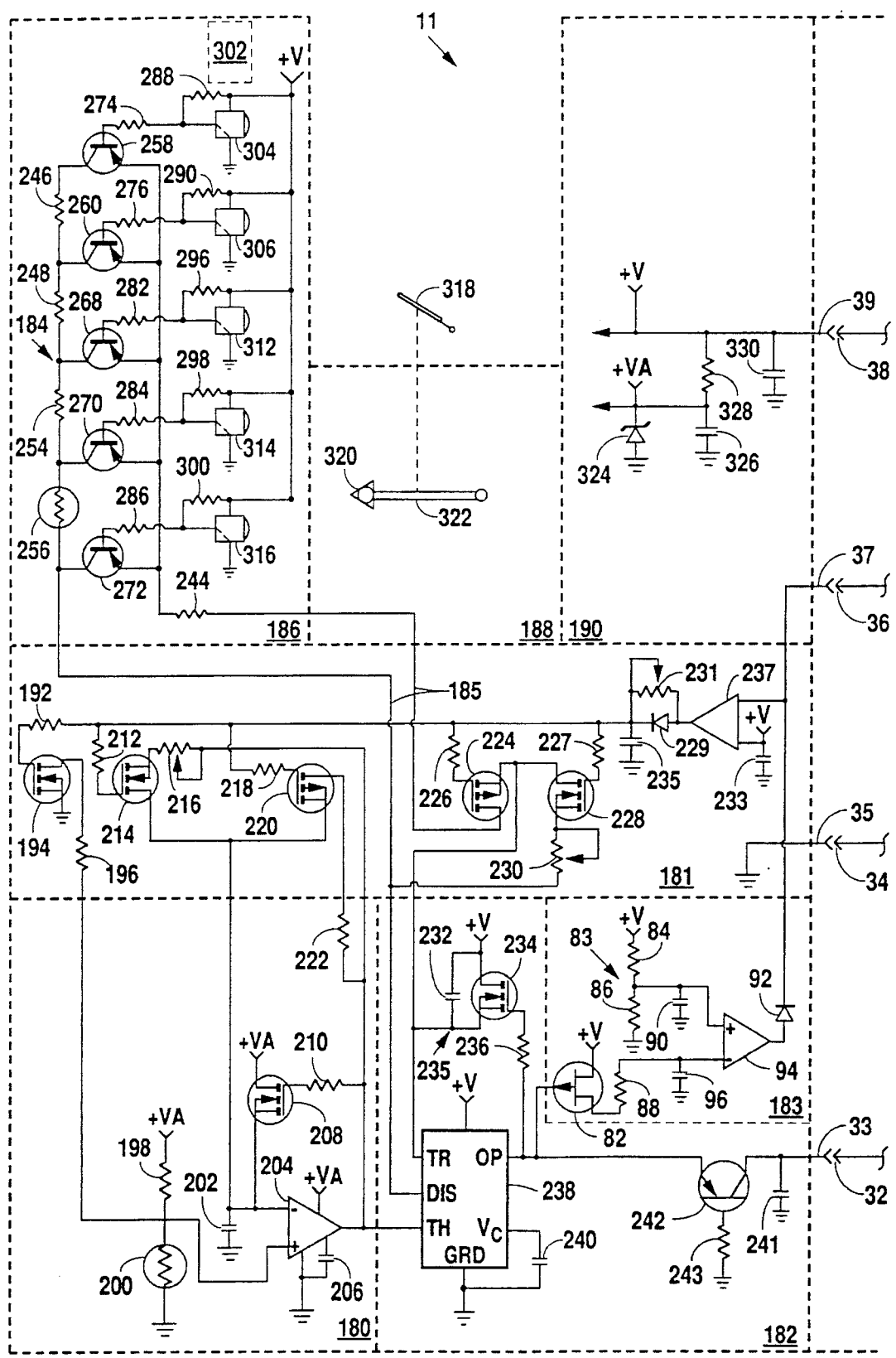
FIG. 1A is a schematic diagram illustrating the signal generation unit of the DC Motor Control System.

As illustrated in FIGS. 1A and B, a DC Motor Control System connects to motor 74 to regulate the delivery of power from a battery or a bank of batteries to motor 74. In this preferred embodiment, motor 74 is a DC motor utilized to drive any suitable device such as a vehicle. Motor 74 includes armature 76 and field coil 78 which induces rotation of armature 76. A drive train typically connects armature 76 to the device so that the rotational motion of armature 76 is imparted to the device, thereby driving it.

The DC Motor Control System normally connects to a switch (not shown) that allows an operator to electrically isolate motor 74 from the battery or bank of batteries during periods of non-use. The switch also functions to electrically isolate the battery or bank of batteries from the components of the DC Motor Control System so that unnecessary power drain will not occur during periods of non-use.

The DC Motor Control System also typically connects to forward/neutral/reverse switch 80 (hereinafter referred to as F/N/R switch 80) to allow the device to be driven in either a forward or reverse direction. F/N/R switch 80 connects to field coil 78 to permit the reversal of the connection points between field coil 78 and the battery or bank of batteries. That reversal in the connection points results in a reversal in the polarity of the magnetic field produced by field coil 78 about armature 76. By reversing the polarity of the magnetic field about armature 76, armature 76 will rotate in two completely opposite directions, thereby furnishing motor 74 with a forward and reverse setting.

The DC Motor Control System includes power control unit 10 and signal generation unit 11. Power control unit 10 and signal generation unit 11 are electrically connected together via cables 33, 35, 37, and 39. Cables 33, 35, 37, and 39 are multi-conductor, shielded cables attached at one end to signal generation unit 11 using any suitable means such as soldering. The opposite ends of cables 33, 35, 37, and 39 include connector terminals which in this preferred embodiment are snap-in clips. Power control unit 10 includes a panel with receiver terminals 32, 34, 36, and 38 that accept the connector terminals of cables 33, 35, 37 and 39 to electrically couple power control unit 10 with signal generation unit 11.

Cable 39 couples power control unit 10 to signal generation unit 11 to supply bias voltage from regulator circuit 14 to signal generation unit 11. Cable 35 connects the reference potentials (i.e., the grounds) of power control unit 10 and signal generation unit 11. Cable 33 couples signal generation unit 11 to power control unit 10 to transmit a duty cycle control signal from signal generation unit 11 to power control unit 10. Cable 37 couples power control unit 10 to signal generation unit 11 to supply a signal that informs signal generation unit 11 that an abnormal operating condition is occurring.

Power control unit 10 includes busbar 164 connected to line 162 to provide the connection between the battery or bank of batteries and power control unit 10. Line 162 connects to the battery or bank of batteries to place the battery voltage represented as +B on busbar 164. Busbar 164, in turn, connects to regulator circuit 14, braking circuit 18, operational safety circuit 22, noise suppression circuit 24, capacitor 40, and motor 74 to supply them with the battery voltage +B. Power control unit 10 includes capacitor 40 to condition any voltage spikes created by the battery or bank of batteries during the operation of motor 74. Furthermore, capacitor 40 aids in sustaining the operation of regulator circuit 14 when switch network 30 conducts.

Voltage regulator circuit 14 includes capacitors 42 and 50, resistors 46 and 48, and voltage regulator 44. Capacitor 50 connects to busbar 164 in parallel with resistors 46 and 48 to filter the battery voltage +B received by resistors 46 and 48. Resistors 46 and 48 form a voltage divider that reduces the level of the battery voltage +B delivered to voltage regulator 44. Voltage regulator 44 receives the reduced voltage and converts it to a constant voltage level +V, which forms the supply voltage for signal generation unit 11. Capacitor 42 connects in parallel with voltage regulator 44 to condition the supply voltage +V. Cable 39 receives the supply voltage +V to furnish signal generation unit 11 with the constant voltage level required for its proper operation.

Signal generation unit 11 includes trigger pulse circuit 180, limit circuit 181, control signal circuit 182, start safety circuit 183, transducer/resistor network 186, sensed element 188, and conditioning circuit 190. As previously described, cable 39 connects to signal generation unit 11 to furnish the supply voltage +V to limit circuit 181, control signal circuit 182, start safety circuit 183, and transducer/resistor network 186, and conditioning circuit 190.

However, signal generation unit 11 includes conditioning circuit 190 to provide trigger pulse circuit 180 with a conditioned supply voltage +Va. Conditioning circuit 190 includes capacitors 326 and 330, resistor 328, and zener diode 324. Capacitor 330 connects to cable 39 to provide stabilization of the supply voltage +V due to the length of cable 39. Capacitor 326 operates as an integrator filter to condition the supply voltage +V into the conditioned supply voltage +Va utilized to bias trigger pulse circuit 180. Conditioning circuit 190 includes zener diode 324 to establish the voltage level of the conditioned supply voltage +Va.

Trigger pulse circuit 180 includes resistors 198, 210, and 222, thermistor 200, capacitors 202 and 206, amplifier 204, and transistor 208 which includes an input terminal, an output terminal, and a control terminal. In this preferred embodiment, transistor 208 is an n-channel enhancement mode MOSFET (metal-oxide semiconductor field effect transistor). Upon the application of power to the DC Motor Control System, conditioning circuit 190 applies the conditioned voltage +Va to amplifier 204, the input terminal of transistor 208, and the voltage divider formed by resistor 198 and thermistor 200. The voltage divider formed by resistor 198 and thermistor 200 receive the conditioned supply voltage +Va from conditioning circuit 190 to provide a reduced level reference voltage across the non-inverting input of amplifier 204. During the initial application of the conditioned supply voltage +Va, capacitor 202 is discharged so that the voltage at the inverting input of amplifier 204 is low. Consequently, amplifier 204 outputs a high signal to control signal circuit 182.

Amplifier 204 further applies a portion of that high signal across the control terminal of transistor 208 via resistor 210. As a result, transistor 208 switches on to apply the conditioned voltage +VA, across capacitor 202 via its output terminal. Capacitor 202 charges rapidly through transistor 208 until it stores a voltage that exceeds the reference voltage applied at the non-inverting input of amplifier 204. When capacitor 202 charges to a voltage that exceeds the reference voltage at the non-inverting input of amplifier 204, the voltage applied across the inverting input of amplifier 204 also exceeds that reference voltage. Consequently, amplifier 204 outputs a low signal to control signal circuit 182.

After amplifier 204 outputs a low signal in response to the above-described charging of capacitor 202, transistor 208 switches off, thereby disconnecting capacitor 202 from conditioning circuit 190. As a result, capacitor 202 discharges to the reference potential (e.g., ground) through the current path including transistor 220, resistor 222, and the output pin of amplifier 204. Transistor 220 (described herein with reference to limit circuit 181) remains switched on during normal operation of the DC Motor Control System to provide the above-described current path for the discharge of capacitor 202 each time the voltage stored in capacitor 202 exceeds the reference voltage at the non-inverting input of amplifier 204.

Once the voltage level stored in capacitor 202 drops below the reference voltage applied to the non-inverting input into amplifier 204, the output from amplifier 204 again switches to a high state so that the above-described cycle repeats. The rapid charging of capacitor 202 through transistor 208 followed by its impeded discharge through transistor 220 and resistor 222 produces a train of limited duration positive going pulses. The discharge rate of capacitor 202 through transistor 220 is established by the value of resistor 222 which determines the period for the pulses. Amplifier 204 outputs the limited duration positive going pulses to control signal circuit 182 to provide control signal circuit 182 with a trigger input.

Figure 2A:
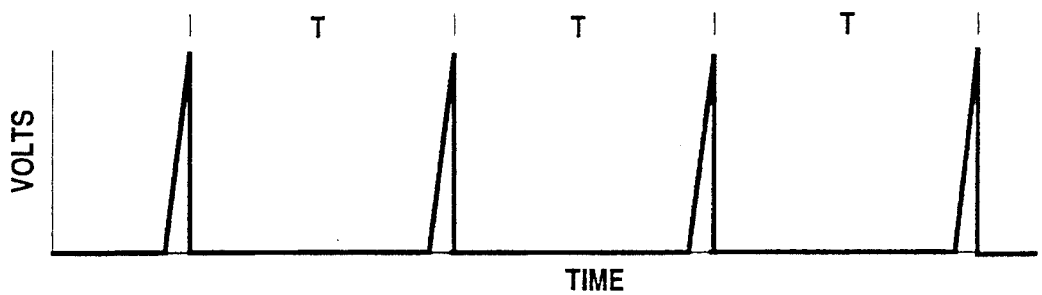
FIG. 2a is a graph illustrating the output from the trigger pulse circuit of the DC Motor Control System.

Referring to FIG. 2a, the waveform output from amplifier 204 consists of a positive going pulse train comprised of short duration pulses. Each positive pulse from trigger pulse circuit 180 initiates a timing cycle and, thus, determines the power waveform frequency of the DC Motor Control System. Period T is constant throughout all levels of system operation, and the low output portion of the wave form is held at or near a reference potential (e.g., ground) while the positive portion of the waveform exceeds the triggering threshold of control signal circuit 182.

Trigger pulse circuit 180 includes capacitor 206 to change the transition points of amplifier 204 so that the possibility of static induced false triggering of amplifier 204 is reduced. Capacitor 206 charges through the balance pin of amplifier 204 during the charging cycle of capacitor 202 and discharges during the discharging cycle of capacitor 202 to raise the level of the voltage applied at the inverting input of amplifier 204. By increasing the voltage level on the inverting input of amplifier 204, the slope of the voltage pulse applied at the inverting input of amplifier 204 increases. That increased slope increases the angle of intersection between the constant reference voltage applied at the non-inverting input of amplifier 204 and the voltage pulse applied at the inverting input of amplifier 204 to produce a sharp trigger point for amplifier 204. Thus, the possibility of static induced false triggering of amplifier 204 is reduced because static voltages produced due to the pulsing of motor 74 rarely produce sharp voltage signals.

Trigger pulse circuit 180 includes thermistor 200 to prevent temperature changes from affecting the output of amplifier 204. If the DC Motor Control System were operated without thermistor 200, any elevation in system component temperature would increase the frequency of the pulse train output from amplifier 204, while drops in system component temperature would decrease that frequency. Changes in the frequency of the pulse train output from amplifier 204 inversely affects its period, resulting in incorrect power delivery to motor 74. Negative temperature coefficient thermistor 200 prevents changes in temperature from affecting the frequency of the pulse train output from amplifier 204 because its resistance value varies dependent upon temperature. That is, when temperature increases, thermistor 200 decreases in resistance to lower the reference voltage applied to the non-inverting input of amplifier 204. Consequently, the frequency of the pulse train outputted from amplifier 204 remains constant despite changes in component performance occurring due to the temperature increase.

Conversely, when the temperature drops, thermistor 200 increases in resistance to increase the reference voltage applied to the non-inverting input of amplifier 204. That maintains the frequency of the pulse train output from amplifier 204 despite changes in component operation resulting from the temperature decrease. Accordingly, thermistor 200 provides a stable frequency for the pulse train output from amplifier 204. Although thermistor 200 is depicted as a single component, it may be implemented through a thermistor/resistor network designed to obtain the desired frequency stabilization during temperature variations.

Signal generation unit 11 includes transducer/resistor network 186 to allow operator control over the delivery of power to motor 74. In response to an operator input, transducer/resistor network 186 activates to regulate the output from control signal circuit 182. Transducer/resistor network 186 permits operator regulation of control signal circuit 182 such that it outputs a duty cycle control signal that varies the application of power to motor 74 from 0% to 100%.

In this preferred embodiment, the DC Motor Control System receives operator input through accelerator 318. Accelerator 318 consists of any device such as a pedal or lever that may be controlled by either a human or another device (e.g., a governor). Sensed element carrier 322 connects to accelerator 318 to transmit operator input to transducer/resistor network 186. Sensed element 188 includes sensed element carrier 322 which is pivotally connected at one end and magnet 320 which connects at the other end of sensed element carrier 322. When no operator input is applied, sensed element 322 is oriented to place magnet 320 in off area 302.

Although not shown, accelerator 318 also connects to a switch that controls the delivery of the battery voltage +B to regulator circuit 14. When accelerator 318 remains undepressed, the switch is open so that regulator circuit 14 receives no voltage, resulting in no voltage being applied across power control unit 10 and signal generation unit 11. However, once an operator depresses accelerator 318, the switch closes to permit the delivery of the battery voltage +B to regulator circuit 14. Consequently, power control unit 10 and signal generation unit 11 activate to regulate the delivery of power to motor 74 until accelerator 318 is released.

Transducers 304, 306, 312, 314, and 316 are Hall effect components that are actuated to a conducting state by the presence of a magnetic field. More particularly, transducers 304, 306, 312, 314, and 316 are current sinking integrated circuits including Schmidt triggers that produce a digital output with a hysteresis transfer function. When magnet 320 is directed toward off area 302, transducers 304, 306, 312, 314, and 316 are a sufficient distance away from it to remove them from its influence. When transducers 304, 306, 312, 314, and 316 are unactuated, the voltage on their terminals floats, therefore, transducer/resistor network 186 includes resistors 288, 290, 296, 298, and 300 connected to transducers 304, 306, 312, 314, and 316, respectively. Resistors 288, 290, 296, 298, and 300 establish the voltage at the outputs of transducers 304, 306, 312, 314, and 316 at a high state to ensure transistors 258, 260, 268, 270, and 272 remain off when transducers 304, 306, 312, 314, and 316 are also off. Transistors 258, 260, 268, 270, and 272 remain off when a high signal is applied at their respective control terminals (i.e., their bases) because, in this preferred embodiment, they are PNP bipolar junction transistors (BJT's). Although transducers actuated by a magnet are described, one skilled in the art will recognize that emitter-receiver pairs could be substituted.

An initial depression of accelerator 318 applies the supply voltage +V to power control unit 10 and signal generation unit 11 and the conditioned supply voltage +Va to trigger pulse circuit 180. Further depression of accelerator 318 moves magnet 320 from off area 302 to the vicinity of transducer 304. Magnet 320 actuates transducer 304 which results in a low signal being applied to transistor 258 through resistor 274. With transistor 258 activated, current path 185 is created among limit circuit 181, control signal circuit 182, and resistor network 184 which includes resistors 244, 246, 248, and 254 and thermistor 256. With current path 185 completed, control signal circuit 182 activates to output a duty cycle control signal having a duration corresponding to the level of the operator input received at transducer/resistor network 186. Control signal circuit 182 outputs the duty cycle control signal to regulate power delivery to motor 74 (described herein).

Transducers 306, 312, 314, and 316 operate in response to the movement of magnet 320 similarly to transducer 304 to activate their respective transistors 260, 268, 270, and 272. That is, a further depression of accelerator 318 moves magnet 320 into the vicinity of transducer 306 to actuate it. Upon the actuation of transducer 306, transistor 260 activates through resistor 276 before transistor 258 deactivates. Consequently, resistor 246 is eliminated from resistor network 184 which now contains resistors 244, 248 and 254 and thermistor 256. With less resistance in resistor network 184, the duration of the duty cycle control signal output from control signal circuit 182 increases to increase power delivery to motor 74.

Still further depression of accelerator 318 moves magnet 320 into the vicinity of transducer 312 to actuate it. Upon the actuation of transducer 312, transistor 268 activates through resistor 282 before transistor 260 deactivates. As a result, resistor 248 is eliminated from resistor network 184 which now contains resistors 244 and 254 and thermistor 256. The lessening of the resistance in resistor network 184 again increases the duration of the duty cycle control signal output from control signal circuit 182 to increase power delivery to motor 74.

An even further depression of accelerator 318 moves magnet 320 into the vicinity of transducer 314 to actuate it. Upon the actuation of transducer 314, transistor 270 activates through resistor 284 before transistor 268 deactivates. Consequently, resistor 254 is eliminated from resistor network 184 which now contains resistor 244 and thermistor 256. The even lower resistance in resistor network 184 increases the duration of the duty cycle control signal output from control signal circuit 182 to increase power delivery to motor 74.

Once accelerator 318 is fully depressed, magnet 320 actuates transducer 316 which, in turn, activates transistor 272 through resistor 286, thus eliminating thermistor 256 from resistor network 184 which now contains only resistor 244. With transducer 316 activated, the resistance of resistor network 184 decreases to a minimum to increase the duration of the duty cycle control signal output from control signal circuit 182 to a maximum so that maximum power delivery to motor 74 occurs.

Thus, transducer 304 when actuated produces a minimum duty cycle control signal, and transducer 316 when actuated produces a maximum duty cycle control signal, while transducers 306, 312, and 314 produce duty cycle control signals between the maximum and minimum values.

Alternatively, the release of accelerator 318 results in the sequential replacement of thermistor 256 and resistors 254, 248, and 246 in resistor network 184. The sequential replacement of resistance in resistor network 184 decreases the duration of the duty cycle control signal output from control signal circuit 182 to decrease the power delivered to motor 74. The complete release of accelerator 318 moves magnet 320 back to off area 302 resulting in the deactivation of control signal circuit 182 to stop the output of the duty cycle control signal so that motor 74 switches off.

Although the preferred embodiment discloses transducer/resistor network 186, one skilled in the art will recognize that the contact/resistor network disclosed in this application's parent (U.S. Pat. No. 5,317,669) could be substituted.

In that instance, transducers 304, 306, 312, 314, and 316 and transistors 258, 260, 268, 270, and 272 are replaced with an equal number of contacts soldered onto the printed circuit board holding signal generation unit 11. Accelerator 318 remains the same, however, sensed element 188 becomes a wiper arm which is connected to pin TR of timer 238 and capable of making electrical connections to each one of the contacts. Resistor 244 connects between the wiper arm and pin TR of timer 238, while resistors 246, 248, 254 and thermistor 256 connect in series between successive contacts to form a resistor network that includes resistor 244. Thus, in operation as an operator depresses accelerator 318, the wiper arm progresses sequentially along the contacts to remove resistors 246, 248, and 254 and thermistor 256 from the resistance network to allow the operator to control the delivery of power to motor 74. Control signal circuit 182 includes threshold signal circuit 235 formed by transistor 234, capacitor 232, and resistor 236; transistor 242; capacitors 240 and 241; resistor 243; and timer 238. In this preferred embodiment, transistor 234 is an n-channel enhancement mode MOSFET having an input terminal connected to the supply voltage +V, an output terminal connected to pin TR of timer 238, and a control terminal connected to pin OP of timer 238 via resistor 236. Transistor 242 is a PNP bipolar junction transistor having an input terminal connected to pin OP of timer 238, an output terminal connected cable 33, and a control terminal connected to the reference potential via resistor 243.

When accelerator 318 is in its off position, the supply voltage +V is not applied to signal generation unit 11 and current path 185 remains open. Consequently, the output from pin OP of timer 238 remains low because timer 238 receives no input. An initial depression of accelerator 318 applies the supply voltage +V to signal generation unit 11, however, current path 185 remains open and timer 238 receives a high signal at pin TR, resulting in its outputting a low signal from pin OP.

After the operator depresses accelerator 318 sufficiently to actuate one of transducers 304, 306, 312, 314, and 316, current path 185 closes, allowing capacitor 232 to begin charging through pin DIS of timer 238 via transistor 224 and resistor network 184 which places resistance in current path 185 dependent upon which one of transducers 304, 306, 312, 314, and 316 is actuated. When the voltage stored by capacitor 232 reaches the threshold voltage of pin TR of timer 238, timer 238 outputs a high signal from pin OP. With a high signal at pin OP of timer 238, transistor 234 switches on due to its connection to pin OP via resistor 236. The switching on of transistor 234 provides a current path that permits capacitor 232 to discharge.

Once timer 238 has been triggered by the charging of capacitor 232 to the threshold voltage of pin TR, it outputs a high signal on pin OP until it receives a trigger pulse at pin TH from trigger pulse circuit 180. After receiving a trigger pulse, timer 238 outputs a low signal from pin OP. Consequently, transistor 234 deactivates so that capacitor 232 begins charging again to repeat the above-described cycle.

The charging time of capacitor 232 relates directly to and is determined by the amount of resistance in resistor network 184. Specifically, lower levels of resistance in resistor network 184 correspond to decreased charging times for capacitor 232 which, in turn, increase the duration of the high signal output from pin OP of timer 238. That is, the signal output by timer 238 on pin OP remains high for a longer interval between successive trigger pulses outputted into pin TH of timer 238 from trigger pulse circuit 180. Conversely, higher levels of resistance in resistor network 184 correspond to increased charging times for capacitor 232 which, in turn, decreases the duration of the high signal output from pin OP of timer 238. That is, the signal output by timer 238 on pin OP remains high for a shorter interval between successive trigger pulses outputted into pin TH of timer 238 from trigger pulse circuit 180. Consequently, the varying of the duty cycle of motor 74 may be controlled through the movement of magnet 320 via accelerator 318 because the position of sensed element carrier 322 determines the amount of resistance in resistor network 184. With sensed element carrier 322 in off area 302, current path 185 is open so that capacitor 232 remains discharged, resulting in timer 238 outputting a low signal from pin OP. Once an operator depresses accelerator 318 so that magnet 320 activates transducer 304 to close current path 185, capacitor 232 begins to charge, however, due to the high resistance presented in current path 185 by resistors 244, 246, 248, and 254 and thermistor 256, capacitor 232 charges relatively slowly. As a result, the time required for capacitor 232 to reach the threshold voltage of pin TR of timer 238 is long, causing timer 238 to output short duration positive pulses from pin OP. The shortness of the duration of the pulses output from timer 238 produces a short duration duty cycle of power delivery to motor 74.

When an operator fully depresses accelerator 318, sensed magnet 320 activates transducer 316 to remove resistors 246, 248, and 254 and thermistor 256 from resistor network 184 so that only resistor 244 remains in current path 185. With only resistor 244 providing resistance in current path 185, the charging time of capacitor 232 is sufficiently fast so that timer 238 outputs a virtually constant high signal. Although timer 238 continues to cycle between a high and low output at pin OP, the low signal remains above the threshold level of driver 140 which continues to output a high signal so that power control unit 10 is unaffected and operates at the constant high signal is output from pin OP of timer 238.

Thus, the duty cycle for motor 74 is controlled between 0% and 100% by varying the resistance in resistor network 184. Each position of sensed element 320 which activates one of sensing elements 304, 306, 312, 314, and 316 produces a different value duty cycle in motor 74 through the range of 0% to 100%. Alternatively, if a less than 100% duty cycle is desired, the value of resistor 244 may be raised to provide a charging time for capacitor 232 that prevents the above-described continuous high output from timer 238.

Control signal circuit 182 includes capacitor 240 connected between pin Vc of timer 238 and a reference potential (e.g., ground) to condition the current flowing within the internal circuitry of timer 238. Similarly, control signal circuit 182 includes capacitor 241 connected in parallel with pin OP to condition the duty cycle control signal output from pin OP of timer 238 and minimize the lower voltage level at maximum output.

Control signal circuit 182 includes transistor 242 to provide a reference potential fault disconnect. Transistor 242 in this preferred embodiment is a PNP BJT but can be a p-channel MOSFET having an input terminal, an output terminal, and a control terminal. During normal operation, the control terminal of transistor 242 remains biased at the reference potential through its connection at resistor 243 so that high signals output from timer 238 are transmitted through transistor 242 on to deliver those signals to driver circuit 28 (described herein).

However, if cable 35, which furnishes the reference potential (e.g., ground) for the DC Motor Control System, becomes disconnected such that an open circuit forms throughout signal generation unit 11 and power control unit 10, timer 238 outputs a constant high signal from pin OP. As a result, motor 74 would turn on at full power regardless of operator input, thereby producing a potentially dangerous situation, if control signal circuit 182 did not include transistor 242.

Transistor 242 prevents the above situation because, an open circuit in cable 35 prevents current flow to the control terminal of transistor 242 so that the high signal received from timer 238 at the input terminal of transistor 242 is blocked by the open state of transistor 242 preventing the delivery of that high signal to driver circuit 28. Consequently, with transistor 242 switched off, motor 74 will receive no power which prevents the potentially dangerous run-away motor situation described above.

Resistor network 184 includes thermistor 256 to provide a temperature compensation that maintains the duty cycle of motor 74 at desired levels through all the movements of sensed element 188 by accelerator 318. That is, changes in temperature will not change the percent duty cycle produced through the systematic activation and deactivation of transducers 304, 306, 312, 314, and 316 because the resistance value of thermistor 256 varies according to temperature. Although thermistor 256 is depicted in FIG. 1A as a single component, it should be understood that it may include a thermistor connected in series and/or parallel with one or more resistors.

Figure 1B:
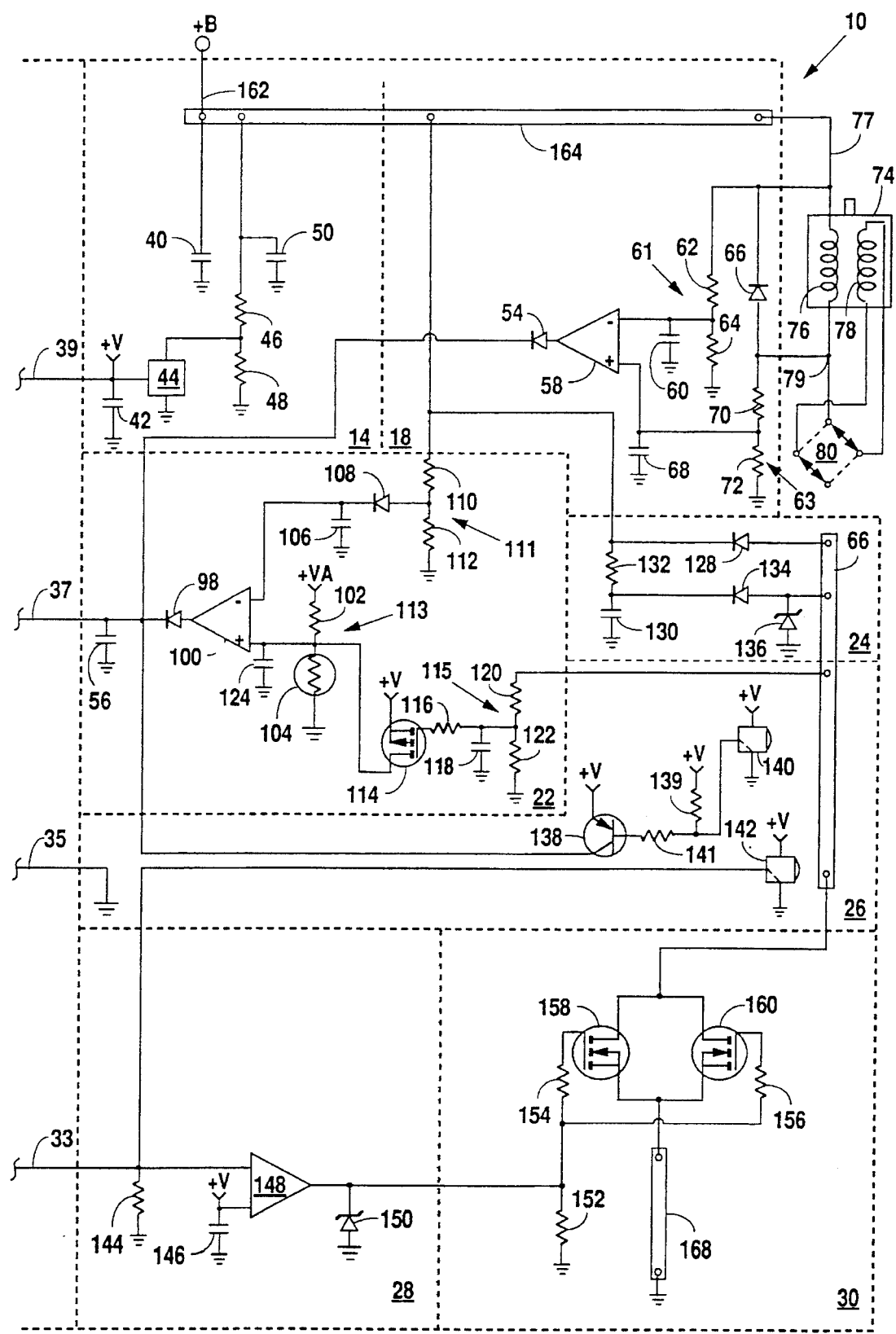
FIG. 1B is a schematic diagram illustrating the power control unit of DC Motor Control System.

As illustrated in FIG. 1B, power control unit 10 includes driver circuit 28 which contains resistor 144, amplifier 148, capacitor 146, and diode 150. Driver circuit 28 connects to control signal circuit 182 via cable 33 to receive the duty cycle control signal output from pin OP of timer 238. Amplifier 148 receives the duty cycle control signal from control signal circuit 182 and outputs an identical duty cycle control signal, except amplifier 148 outputs a duty cycle control signal with an increased current level. Amplifier 148 increases the current level of the duty cycle control signal to provide the current levels required to activate switch network 30.

Driver circuit 28 includes resistor 144 to provide a safety component that furnishes a low signal to amplifier 148 in response to an open circuit in cable 33. If driver circuit did not include resistor 144, an open circuit in cable 33 would produce a floating input into amplifier 148. Amplifier 148 will interpret that floating input as a high signal and will output a high signal accordingly, resulting in the potentially dangerous situation of a run-away motor.

Driver circuit 28 includes capacitor 146, connected in parallel with amplifier 148, to condition the supply voltage +V utilized to bias amplifier 148. Driver circuit 28 also includes diode 150, a zener diode in this preferred embodiment, which suppresses transient voltage spikes output from amplifier 148 to prevent damage to switch network 30.

Power control unit 10 includes switch network 30 to regulate the delivery of power to motor 74 in accordance with the duty cycle control signal output from amplifier 148 of driver circuit 28. Switch network 30 includes transistors 158 and 160 which, in this preferred embodiment, are n-channel enhancement mode power MOSFETs, each having an input terminal, an output terminal, and a control terminal.

Transistors 158 and 160 are arranged in parallel with switch network 30 being connected in series with the battery or bank of batteries, motor 74, F/N/R switch 80, busbars 166 and 168, and the reference potential (e.g., ground). The input terminals of transistors 158 and 160 connect at a common point which, in turn, connects to the return side of motor 74 via busbar 166 and F/N/R switch 80. The output terminals of transistors 158 and 160 similarly connect at a common point which, in turn, connects to the reference potential via busbar 168. The control terminals of transistors 158 and 160 each connect to the output from amplifier 148 via resistors 154 and 156, respectively. Transistors 158 and 162 operate as high speed switches to complete the current path from the return side of motor 74 to the reference potential in response to the duty cycle control signal received from driver circuit 28 at their control terminals.

Transistor network 30 includes resistor 152 to shunt a small amount of current delivered from amplifier 148 of driver circuit 28 to the reference potential. Resistor 152 shunts a small amount of that current to increase and cushion the "on" rise times of the internal gate capacitances of transistors 158 and 160. Additionally, resistor 152 maintains a low signal at the control terminals of transistors 158 and 160 in the event the output from amplifier 148 floats due to a system malfunction. Consequently, transistors 158 and 160 remain off so that accidental activation of motor 74 is avoided.

Figure 2B:
FIGS. 2b–e are graphs illustrating example outputs from the control signal and driver circuits of the DC Motor Control System.

During normal operation, the positioning of sensed element 188 at off area 302 maintains motor 74 at rest because, as previously described, control signal circuit 182 outputs no duty cycle control signal to driver circuit 28. As a result, driver circuit 28 outputs no duty cycle control signal (see FIG. 2b) to transistors 158 and 160. Transistors 158 and 160 are thus switched off so that the current path from motor 74 to the reference potential remains open.

Figure 2C:
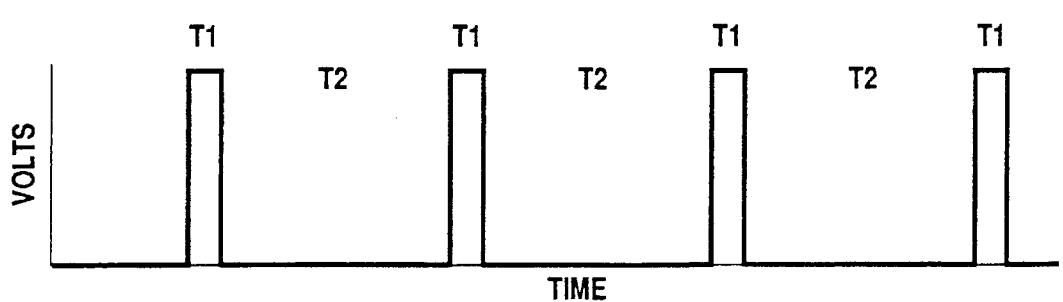

As an operator initiates the DC Motor Control System through the depression of accelerator 318, control signal circuit 182 outputs a short duration positive pulse duty cycle control signal to driver circuit 28. In response, driver circuit 28 outputs an amplified duty cycle control signal (see FIG. 2c) to the control terminals of transistors 158 and 160. Consequently, transistors 158 and 160 switch on during time T1 to close the current path from motor 74 to the reference potential and switch off during time T2 to open the current path from motor 74 to the reference potential. Motor 74, therefore, receives power from the battery or bank of batteries during time T1. The duty cycle control signal illustrated in FIG. 2c, which represents the minimum duty cycle required to initiate activation of motor 74, is created when magnet 320 of sensed element 188 activates transducer 304 to complete current path 185 with resistors 244, 246, 248, and 254 and thermistor 256 included therein.

Figure 2D:
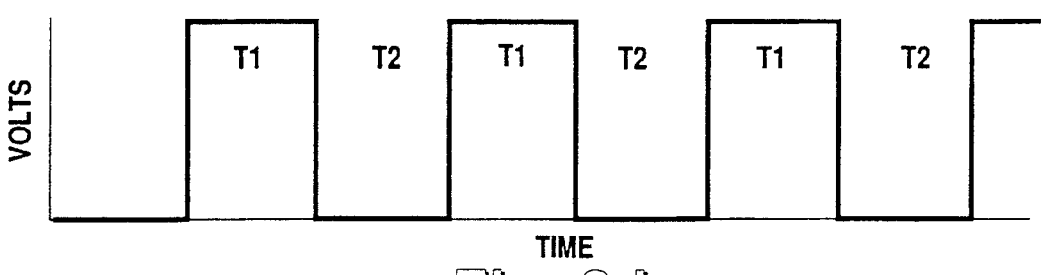

Upon further depression of accelerator 318, sensed element 188 moves among the intermediate transducers 306, 312, and 314 to remove resistance from resistor network 184 as previously described. As a result, control signal circuit 182 outputs an increasing duration positive pulse duty cycle control signal to driver circuit 28. Driver circuit 28 receives that signal and outputs an amplified duty cycle control signal (see FIG. 2d) to the control terminals of transistors 158 and 160. Transistors 158 and 160 switch on during time T1 to close the current path from motor 74 to the reference potential and switch off during time T2 to open the current path from motor 74 to the reference potential. Motor 74, therefore, receives power from the battery or bank of batteries for a longer time period due to the increased duration of time T1 for the duty cycle control signal output from driver circuit 28. The positive pulse forming the duty cycle control signal illustrated in FIG. 2d provides an intermediate power delivery to motor 74.

Figure 2E:
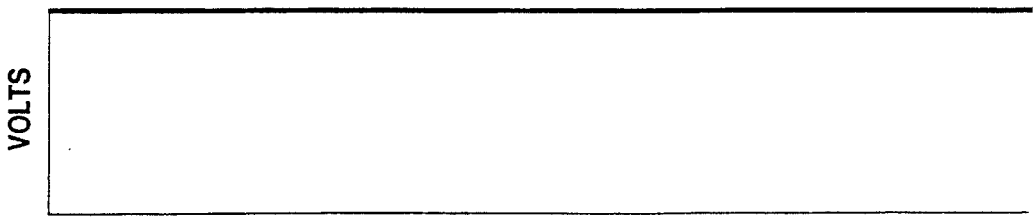

With accelerator 318 fully depressed, magnet 320 of sensing element 188 activates transducer 3–16, resulting in control signal circuit 182 outputting a 100% duty cycle control signal to driver circuit 28. Consequently, driver circuit 28 outputs the duty cycle control signal illustrated in FIG. 2e to transistors 158 and 160. Transistors 158 and 160 are thus switched on so that the current path from motor 74 to the reference potential remains closed. With transistors 158 and 160 biased on for 100% of the time, motor 74 receives constant power from the battery or bank of batteries and, thus, is also on for 100% of the time.

Although FIGS. 2b-e illustrate volts per time, if amps is substituted for volts, a graphic representation of the current through switch network 30 at the corresponding duty cycles is obtained.

Using pulse trains to regulate power delivery to motor 74 improves over conventional continuous power application systems because it avoids the waste of energy experienced due to a continuous delivery of power to a motor. Although pulsing motor 74 results in off periods during its continuous operation, an operator will not perceive any noticeable change in operating characteristics between a continuous power application system and a pulsed control system because motor and vehicle inertia provides smooth motor acceleration. The step method of changing speeds, therefore, conserves more energy than continuous power application systems because power is applied in short pulses rather than continuously over any range of motor speed.

At any point along the speed range of a motor, there is a finite amount of energy required to cause a perceptible change in the present motor speed. These energy requirements increase at higher rates of speed. Accordingly, by judiciously choosing the resistor values and the number of steps in transducer/resistor network 186, an acceleration curve may be established which provides smooth motor operation while still maximizing operational efficiency.

Although only two transistors are illustrated in FIG. 1B, one of ordinary skill in the art will recognize that the load demand and current carrying capacity of the particular MOSFETs utilized dictates the actual number of these devices incorporated into switch network 30. Additionally, even though MOSFETs implement switch network 30, it should be understood that any other type of power transistor or similar switching device may be substituted.

Power control unit 10 includes noise suppression circuit 24 to prevent transients from damaging the DC Motor Control System. Noise suppression circuit 24 includes zener diode 136, freewheeling diode 128, and a voltage clamping circuit formed by Schottky diode 134, capacitor 130 and resistor 132. Free-wheeling diode 128 connects in parallel with motor 74 to create a low resistance current path to the battery or bank of batteries when transistors 158 and 160 switch from on to off. That low resistance current path allows a rapid collapse of the magnetic field created by armature 76 and field coil 78 of motor 74 to prevent the creation of voltage spikes and to ensure that residual magnetic field effects are dissipated before transistors 158 and 160 apply the next pulse to motor 74.

Zener diode 136 connects in parallel with motor 74 to create a low resistance current path that shunts transient voltage spikes to the reference potential. Zener diode 136 operates at a voltage level slightly above maximum battery voltage so that transient voltage spikes exceeding the breakdown voltage of transistors 158 and 160 are snubbed. Such transient voltage spikes would damage transistors 158 and 160 and, therefore, must be eliminated.

The voltage clamping circuit formed by diode 134, capacitor 130, and resistor 132 operates in conjunction with free-wheeling diode 128 to suppress transient voltage spikes created due to the collapsing magnetic field of motor 74 resulting from the switching of transistors 158 and 160 from on to off. When the voltage at busbar 166 exceeds the battery voltage +B, diode 134 conducts so that capacitor 130 charges to eliminate the excessive voltage at busbar 166. After the voltage level at busbar 166 returns to the battery voltage +B, diode 134 ceases to conduct, resulting in capacitor 130 discharging through resistor 132 to the reference potential (e.g., ground) until its voltage level reaches the battery voltage +B.

Power control unit 10 includes current limiting circuit 26 to prevent excess current conditions from damaging the DC Motor Control System and motor 74. Current limiting circuit 26 includes transducers 140 and 142 which are Hall effect transducers activated in response to an electromagnetic field created by current flowing through a conductor. When activated, transducer 142 provides a low resistance current path to produce a current sink.

The flux density of an electromagnetic field created by current flowing through a conductor is directly proportional to the amount of current flowing and diminishes proportionally as its distance from the conductor increases. Transducers 140 and 142 are located within the electromagnetic field created by the motor current flowing through busbar 166 when transistors 158 and 160 are conducting. However, transducers 140 and 142 are located at distances from busbar 166 such that only current levels above a specified value result in their activation.

Specifically, the current flowing through busbar 166 will not produce an electromagnetic field with a sufficient flux density to activate transducer 142 until the current flowing through busbar 166 reaches maximum motor current. The output of transducer 142 connects to the duty cycle control signal input into amplifier 148 so that, when actuated, transducer 142 will sink the duty cycle control signal to the reference potential.

As a result of transducer 142 sinking the duty cycle control signal, amplifier 148 outputs a low signal which switches off transistors 158 and 160, thereby preventing current flow to motor 74. Once transistors 158 and 160 switch off, the current through motor 74 and, thus, busbar 166 begins to decrease. Transducer 142 sinks the duty cycle control signal to the reference potential until the current flowing through busbar 166 diminishes to a level below maximum motor current.

Once the current flowing through busbar 166 reduces to a level below maximum motor current, transducer 142 deactivates, whereupon, the duty cycle control signal again reaches amplifier 148. In response, amplifier 148 outputs a high signal which switches on transistors 158 and 160 to again permit current flow to motor 74. Accordingly, the disruption of current flow to motor 74 at maximum motor current prevents the current flowing through motor 74 from reaching a value sufficient to damage the DC Motor Control System.

Current limiting circuit 26 includes transducer 140, resistors 139 and 141, and transistor 138 to limit motor current in the event transducer 142 fails. In this preferred embodiment, transistor 138 is a PNP bipolar junction transistor having an input terminal, an output terminal, and a control terminal. During normal operation, transducer 140 remains unactivated so that the supply voltage +V is applied via resistors 139 and 141 to the control terminal of transistor 138 to bias transistor 138 off.

However, if the current flowing through motor 74 exceeds the maximum motor current level, transducer 140 activates to sink the current normally applied to the control terminal of transistor 138. Consequently, transistor 138 switches on to apply a high signal to cable 37. Cable 37 applies the high signal to limit circuit 181 (see FIG. 1A) so that limit circuit 181 activates to assume control of the delivery of power to motor 74 (described herein).

Power control unit 10 includes operational safety circuit 22 to prevent either intentional or negligent abuse of motor 74, the battery or bank of batteries supplying power to motor 74, and the DC Motor Control System. An intentional abuse of motor 74 occurs when an operator positions F/N/R switch 80 in its neutral position, moves accelerator 318 to its fully depressed position, and then places F/N/R switch 80 into either its forward or reverse position. Consequently, motor 74 would activate at full power which damages not only motor 74 but also the device driven by motor 74. Negligent abuse includes operating motor 74 with a low charge on its battery or bank of batteries, which increases charging costs and shortens battery life. Negligent abuse further includes operating the motor 74 at excessive temperatures that occur from either natural conditions or DC Motor Control System overloading for extended periods.

Voltage divider 111 formed by resistors 110 and 112 connects to busbar 164 to reduce the battery voltage +B supplied to the inverting input of amplifier 100. The output from voltage divider 111 connects to the inverting input of amplifier 100 via diode 108, while capacitor 106 connects in parallel with that output. Diode 108 and capacitor 106 condition the voltage delivered to the inverting input of amplifier 100 to maintain the reduced voltage applied across the inverting input of amplifier 100 at a stable percentage of the battery voltage +B.

Similarly, voltage divider 113 formed by resistor 102 and thermistor 104 reduces the supply voltage +V furnished to the non-inverting input of amplifier 100. The output from voltage divider 113 connects to the non-inverting input of amplifier 100, while capacitor 124 connects in parallel with that output. Capacitor 124 conditions the voltage delivered to the non-inverting input of amplifier 100 to maintain the reduced voltage applied across the non-inverting input of amplifier 100 at a stable percentage of the supply voltage +V. During normal operation (i.e., the battery or bank of batteries are well charged and motor 74 is operating within an acceptable temperature range), the voltage applied to the inverting input of amplifier 100 is higher than the voltage applied to the non-inverting input of amplifier 100. Consequently, amplifier 100 outputs a low signal to limit circuit 181 via cable 37, resulting in limit circuit 181 remaining off so that normal operation of motor 74 occurs.

As the battery or bank of batteries powering motor 74 discharge, the magnitude of the voltage applied to the inverting input of amplifier 100 by voltage divider 111 diminishes accordingly. When the battery voltage +B drops to a preselected battery discharge level, the voltage applied to the inverting input of amplifier 100 falls to a level below the voltage applied to the non-inverting input of amplifier 100 by voltage divider 113. In response, amplifier 100 outputs a high signal to limit circuit 181 via cable 37, thereby activating limit circuit 181 (described herein). The voltage level at which the non-inverting input exceeds the inverting input into amplifier 100 (i.e., the preselected battery discharge level) is determined through the selection of resistance values for resistors 102, 110, and 112 and the value of thermistor 104.

Operational safety circuit 22 includes thermistor 104 to prevent excessive temperatures from damaging motor 74 and the DC Motor Control System. Because thermistor 104 is a positive temperature coefficient component, its resistance increases as the temperature of power control unit 10 increases. Thus, as the resistance of thermistor 104 increases, the magnitude of the voltage applied to the non-inverting input of amplifier 100 increases. When the temperature of the DC Motor Control System reaches a level where component damage may occur, thermistor 104 reaches a resistance value that produces a voltage across the non-inverting input of amplifier 100 which is greater than the voltage across the inverting input of amplifier 100. Consequently, amplifier 100 outputs a high signal to limit circuit 181, resulting in the activation of limit circuit 181 (described herein). The temperature at which amplifier 100 outputs a high signal to limit circuit 181 is determined through the selection of the value for thermistor 104.

During normal operation, an operator first closes F/N/R switch 80 and then depresses accelerator 318 to permit the delivery of power to motor 74. However, if the operator attempts to start motor 74 with accelerator 318 depressed before closing F/N/R switch 80, limit circuit 181 must be activated to control power delivery to motor 74 so that damage to motor 74 and the device driven by motor 74 as well as possible injury to the operator may be prevented.

Voltage divider 115 formed by resistors 120 and 122 connects to busbar 166 to reduce the voltage applied to transistor 114. In this preferred embodiment, transistor 114 is a p-channel enhancement mode MOSFET having an input terminal connected to the supply voltage +V, an output terminal connected to the non-inverting input of amplifier 100, and a control terminal connected to the output from voltage divider 115 via resistor 116. Capacitor 118 connects in parallel with the output from voltage divider 115 to condition the voltage output from voltage divider 115. Under normal operation of motor 74 (i.e., F/N/R switch 80 closed before the depression of accelerator 318), voltage divider 115 applies a voltage across the control terminal of transistor 114 which biases it off.

However, with F/N/R switch 80 open and power applied to switch network 30 due to the depression of accelerator 318, busbar 166 receives no voltage. Consequently, voltage divider 115 outputs no voltage to the control terminal of transistor 114 and, instead, couples the control terminal of transistor 114 to the reference potential through both resistors 120 and 122. With the control terminal of transistor 114 coupled to the reference potential, transistor 114 activates to apply the supply voltage +V to the non-inverting input of amplifier 100. With the supply voltage +V applied at the non-inverting input of amplifier 100, amplifier 100 outputs a high signal to limit circuit 181 via cable 37, thereby activating it. Once activated limit circuit 181 controls the delivery of power to motor 74 until normal operator control may be resumed (described herein).

Operational safety circuit 22 includes capacitor 124 to prevent false triggering of amplifier 100 during the initial application of power to the DC Motor Control System. That is, as capacitor 124 charges upon the application of power, its sinks high signals that would otherwise be applied at the non-inverting input of amplifier 100. Consequently, amplifier 100 outputs a low signal to limit circuit 181 until capacitor 124 fully charges, whereupon, normal functioning of operational safety circuit begins as previously described.

Operational safety circuit 22 includes diode 98 to prevent amplifier 100 from sinking high signals developed by circuits 18, 26 or 183 when amplifier 100 outputs a low signal. Additionally, resistor 56 connects to cable 37 to couple cable 37 to the reference potential so that limit circuit 181 remains off when amplifier 100 outputs a low signal.

Power control unit 10 includes braking circuit 18 to negate the potentially dangerous situation created when an operator reverses F/N/R switch 80 while power is applied to motor 74. The above situation is extremely dangerous if motor 74 drives a vehicle because, when the polarity of the voltage applied across motor 74 changes, the vehicle will stop abruptly causing a possible crash. At a minimum, motor 74 will be driven as a generator resulting in a dramatically increased current that damages the DC Motor Control System.

As previously described, motor 74 includes armature 76 and field coil 78 which creates a magnetic field about armature 76. The magnetic field created by field coil 78 interacts with a magnetic field created by armature 78 to produce the rotational motion of armature 76 so that motor 74 will drive a device such as a vehicle. F/N/R switch 80 connects to field coil 78 to reverse the polarity of the magnetic field created by field coil 78. The reversal of the magnetic field produced by field coil 78 permits rotational motion of armature 76 in two directions to provide forward and reverse settings for motor 74.

During normal operation of motor 74 regardless of whether it is producing forward or reverse motion, the polarity of armature 76 is such that terminal 77 is more positive than terminal 79. Consequently, voltage divider 61, formed by resistors 62 and 64, supplies a voltage to the inverting input of amplifier 58 which is greater than the voltage supplied to the non-inverting input of amplifier 58 by voltage divider 63, formed by resistors 70 and 72. Thus, amplifier 58 outputs a low signal to limit circuit 181 via cable 37.

Braking circuit 18 includes capacitor 60 to form an integrator filter with resistor 62 of voltage divider 61. Similarly, capacitor 68 forms an integrator filter with resistor 70 of voltage divider 63. The two integrator filters filter noise generated in power control unit 10 due to the pulsing of the current delivered to motor 74 in order to prevent false triggering of amplifier 58. Additionally, braking circuit 18 includes diode 54 to prevent high outputs generated by operational safety circuit 22, current limiting circuit 26, or start safety circuit 183 from sinking to the reference potential through amplifier 58 when amplifier 58 outputs a low signal.

Braking circuit 18 includes diode 66 to allow amplifier 58 to sense if an operator reverses the position of F/N/R switch 80 during the operation of motor 74. When F/N/R switch 80 reverses during the operation of motor 74, armature 76 will be driven by the device connected to motor 74, resulting in motor 74 functioning as a generator. Consequently, the polarity across armature 76 changes such that terminal 79 becomes more positive than terminal 77. In response, diode 66 conducts and voltage divider 63 applies a voltage to the non-inverting input of amplifier 58 which is greater than the voltage applied to the inverting input of amplifier 58 by voltage divider 61. As a result, amplifier 58 outputs a high signal that activates limit circuit 181. Limit circuit 181 controls the operation of motor 74 until the polarity across armature 76 returns to its normal state.

As previously described, the DC Motor Control System typically includes a key switch (not shown) to allow electrical isolation of motor 74, power control unit 10, and signal generation unit 11 from the battery or bank of batteries. However, the inclusion of a key switch or other similar device presents the situation where an operator may either intentionally or unknowingly damage motor 74 and the DC Motor Control System or injure himself by turning on the key switch while accelerator 318 is held in an on position.

Accordingly, as illustrated in FIG. 1A, signal generation unit 11 includes start safety circuit 183 to prevent an operator from controlling the delivery of power to motor 74 if the key switch (not shown) is turned on while accelerator 318 is depressed. Start safety circuit includes amplifier 94; transistor 82; diode 92; resistors 84, 86, and 88; and capacitors 90 and 96. In this preferred embodiment, transistor 82 is a junction field effect transistor (JFET) having an input terminal connected to the supply voltage +V, an output connected to the inverting input of amplifier 94 via resistor 88, and a control terminal connected to pin OP of timer 238.

During normal initiation of power delivery to motor 74, the operator activates the key switch before depressing accelerator 318. When the operator activates the key switch before depressing accelerator 318, voltage divider 83 formed by resistors 84 and 86 receives the supply voltage +V and applies a reduced level reference voltage to the non-inverting input of amplifier 94. Additionally, timer 238 of control signal circuit 182 outputs a low signal as previously described which is received at the control terminal of transistor 82. That low output biases transistor 82 on so that the output terminal of transistor 82 applies the supply voltage +V to the inverting input of amplifier 94. In response, amplifier 94 outputs a low signal to limit circuit 181 (described herein) because the supply voltage +V applied across its inverting input is greater than the reference voltage applied across its non-inverting input. Consequently, limit circuit 181 remains off so that the operator controls the power delivery to motor 74 by manipulating accelerator 318.

Conversely, if the operator depresses accelerator 318 before turning on the key switch, timer 238 of control signal circuit 182 outputs a high signal due to the activation of transducer/resistor network 186 as previously described when the key switch is turned on. When transistor 82 receives that high output at its control terminal, it biases off so that the supply voltage +V is not applied to the inverting input of amplifier 94. In response, amplifier 94 outputs a high pulse signal to limit circuit 181 (described herein) because the voltage applied across its inverting input is less than the reference voltage applied across its non-inverting input. Consequently, limit circuit 181 activates to control the delivery of power to motor 74. Start safety circuit 183 includes diode 92 to prevent amplifier 94 from sinking high signals from braking circuit 18, operational safety circuit 22, or current limit circuit 26 to the reference potential when amplifier 94 outputs a low signal. Start safety circuit 183 includes capacitors 90 and 96 to prevent false triggering of amplifier 94 during the initial application of power to the DC Motor Control System. That is, while capacitors 90 and 96 charge, amplifier 94 receives no signals, resulting in it outputting a low signal to limit circuit 181. However, after capacitors 90 and 96 charge, start safety circuit 183 begins operating as described above.

Capacitor 96 further functions to prevent false triggering of amplifier 94 during the normal operation of the DC Motor Control System. If the operator turns on the key switch before depressing accelerator 318, transistor 82 biases on which results in capacitor 96 charging to the supply voltage +V and amplifier 94 outputting a low signal to limit circuit 181. However, upon the depression of accelerator 318, timer 238 outputs a duty cycle control signal as previously described which varies in duration from greater than 0% to 100%. Thus, transistor 82 biases off for a time period equal to the duration of the duty cycle control signal (i.e., from greater than 0% to 100%). Capacitor 96 prevents the biasing off of transistor 82 from triggering amplifier 94 because it maintains the voltage applied at the inverting terminal of amplifier 94 at the supply voltage +V due to its charging to that voltage level during the initial application of power to the DC Motor Control System.

Signal generation unit 11 includes limit circuit 181 to assume control of the delivery of power to motor 74 in the event of operator abuse. Limit circuit 181 includes transistors 194, 214, and 228 which are n-channel MOSFETS and transistors 220 and 226 which are P-channel MOSFETS. Transistor 194 includes an input terminal connected to the voltage divider formed by transistor 198 and thermistor 200 via resistor 196, an output terminal connected to the reference potential, and a control terminal connected to the output of gate driver amplifier 237 via resistor 192. Transistor 214 includes an input terminal connected to capacitor 202, an output terminal connected to the output of amplifier 204 via variable resistor 216, and a control terminal connected to the output of gate driver amplifier 237 via resistor 212. Transistor 220 includes an input terminal connected to capacitor 202, an output terminal connected to the output of amplifier 204 via resistor 222, and a control terminal connected to the output of driver amplifier 237 via resistor 218. Transistor 226 includes an input terminal connected to capacitor 232 and pin TR of timer 238, an output terminal connected to resistor network 184, and a control terminal connected to the output of gate driver amplifier 237 via resistor 224. Transistor 228 includes an input terminal connected to capacitor 232 and pin TR of timer 238, an output terminal connected to pin DIS of timer 238 via variable resistor 230, and a control terminal connected to the output of driver amplifier 237 via resistor 227. Limit circuit 181 further includes gate driver amplifier 237; capacitors 233 and 235; variable resistors 216, 230, and 231; and diode 229 which prevents gate driver amplifier 237 from sinking high signals within limit circuit 181 to the reference potential when gate driver amplifier 237 output reverts to a low signal.

The first input of gate driver amplifier 237 of limit circuit 181 connects to the supply voltage +V, while the second input connects to braking circuit 18, operational safety circuit 22, current limiting circuit 26, start safety circuit 183, and resistor 56. Capacitor 233 connects in parallel with the first input of gate driver amplifier 237 to condition the supply voltage +V delivered to that input. During standard operation without operator abuse, the second input of gate driver amplifier 237 receives a low signal from resistor 56. Consequently, gate driver amplifier 237 outputs a low signal so that limit circuit 181 remains unactivated.

When conditions dictate one of braking circuit 18, operational safety circuit 22, current limiting circuit 26, and start safety circuit 183 activates as previously described to output a high signal to the second input of gate driver amplifier 237. In response, gate driver amplifier 237 outputs a high signal which charges capacitor 235; biases transistors 194, 214, and 228 on; and biases transistors 220 and 226 off.

The biasing on of transistor 194 places resistor 196 in parallel with thermistor 200 so that the voltage divider delivers a reduced level reference voltage to the non-inverting input of amplifier 204. Furthermore, transistor 220 biases off and transistor 214 biases on so that capacitor 202 discharges through variable resistor 222 instead of resistor 222. The resistance of variable resistor 216 is set at a resistance value larger than resistor 222 to produce a decrease in the discharge rate of capacitor 202. The decreased rate of discharge for capacitor 202 combined with the reduced level reference voltage applied to the non-inverting input of amplifier 204 causes a decrease in the frequency of the trigger pulses output from amplifier 204. In this preferred embodiment, the frequency of the trigger pulses are reduced from approximately 20 kilohertz to a range of between approximately 1.5 kilohertz to approximately 2.0 kilohertz.

Transistor 226 biases off to open current path 185 and transistor 228 biases on so that capacitor 232 charges through variable resistor 230 instead of resistor network 184. The resistance of variable resistor 230 is set at a resistance value larger than the largest value of resistor network 184 in order to increase the charging time of capacitor 232 to a constant value. In this preferred embodiment, the charging time of capacitor 232 increases to between approximately 494 and 660 microseconds. That increase in charging time increases the time required for capacitor 232 to reach the trigger threshold voltage of timer 238. Consequently, timer 238 outputs a high signal for only a 5 or 6 microsecond duration between the reduced frequency trigger pulses, resulting in an extremely low percentage duty cycle control signal. In this preferred embodiment, timer 238 of control signal circuit 182 outputs a duty cycle control signal that operates motor 74 at a power level of between approximately 0.75 and 1.2%.

Limit circuit 181 controls both trigger pulse circuit 180 and control signal circuit 182 as described above until the operation of motor 74 returns to normal. That is, the abnormal operating conditions previously described with reference to breaking circuit 18, operational safety circuit 22, current limiting circuit 26, and start safety circuit 183 must be eliminated before operator control may be resumed. Illustratively, low batteries must be charged, operating currents reduced to normal levels, or excessive heat dissipated from the DC Motor Controller System.

Limit circuit 181 further prevents an open in cable 37 from causing damage to either motor 74 or the DC Motor Control System. An open in cable 37 disconnects resistor 56 and places the input into the second input of gate driver amplifier 237 in a floating state. In response to a floating signal, gate driver amplifier 237 outputs a high signal that controls trigger pulse circuit 180 and control signal circuit 182 to deliver a low percentage duty cycle control signals to motor 74 as previously described.

Limit circuit 181 includes capacitor 235 to maintain limit circuit 181 activated for a predetermined time period after gate driver amplifier 237 discontinues its high output. That is, with gate driver amplifier 237 outputting a high signal, capacitor 235 charges rapidly and remains at a high voltage level. Once gate driver amplifier 237 ceases outputting a high signal, capacitor 235 discharges to maintain transistors 194, 212 and 228 biased on and transistors 220 and 226 biased off. The discharging of capacitor 235 allows limit circuit 181 to control trigger pulse circuit 180 and control signal circuit 182 for a time period after gate driver amplifier 237 outputs a low signal. As capacitor 235 discharges, transistors 194, 212 and 228 begin to bias off and transistors 220 and 226 begin to bias on so that operator control of power delivery to motor 74 starts to resume. If the operator depresses and holds accelerator 318, motor 74 will accelerate at a rate controlled by the discharging of capacitor 235 through variable resistor 231. In that instance, motor 74 accelerates up to the speed dictated by the position of accelerator 318 as previously described.

FIG. 3 illustrates a first alternative embodiment of transducer/resistor network 186 which connects to control signal circuit 182 to regulate timer 238. Timer 238, capacitor 232, resistor 236, and transistor 234 remain the same and operate as previously described to output a duty cycle control signal. However, transistor 336 has been added to control the application of the supply voltage +V to capacitor 232 and transistor 234. Transistor 336 is a p-channel enhancement mode JFET having an input terminal connected to the supply voltage +V, an output terminal connected to capacitor 232 and the input terminal of transistor 234, and a control terminal connected to transducer 316. Additionally, resistor 300 connects the control terminal of transistor 336 to the reference potential so that transistor 336 remains activated when transducer 316 is unactivated.

Transducers 304, 306, 312, 314, and 316 remain the same and are, thus, Hall effect components actuated to a conducting state by the presence of a magnetic field. When magnet 320 is directed towards off area 302, it is a sufficient distance away from transducers 304, 306, 312, 314, and 316 to remove them from its influence. When transducers 304, 306, 312, 314, and 316 are unactuated, the voltage on their terminals floats. Thus, transducer/resistor network 186 includes resistors 288, 290, 296, 298, and 300 connected to transducers 304, 306, 312, 314, and 316, respectively. Resistors 288, 290, 296, 298, and 300 establish the voltage at the outputs of transducers 304, 306, 312, 314, and 316 at a low state to ensure transistors 262, 264, 266, 269, and 334 remain off when transducers 304, 306, 312, 314, and 316 are also off. Transistors 262, 264, 266, 269, and 334 remain off when a low signal is applied at their respective control terminals (i.e., their bases) because, in this preferred embodiment, they are NPN bipolar junction transistors (BJT's).

An initial depression of accelerator 318 (see FIG. 1A) moves sensed element 188 to the vicinity of transducer 304. Magnet 320 actuates transducer 304 which results in a high signal being applied to transistor 262 through resistor 274. With transistor 262 activated, current path 185 is created to couple resistor network 184 with control signal circuit 182. Resistor network 184 remains the same except resistor 244 has been eliminated. With current path 185 completed, control signal circuit 182 activates to output a duty cycle control signal having a duration corresponding to the level of the operator input received at transducer/resistor network 186.

Transducers 306, 312, 314, and 316 operate in response to the movement of sensing element 188 similarly to transducer 304 to activate their respective transistors 264, 266, 269, and 334. That is, a further depression of accelerator 318 moves sensing element 188 into the vicinity of transducer 306 to actuate it. Upon the actuation of transducer 306, transistor 264 activates through resistor 276 before transistor 262 deactivates. Consequently, resistor 246 is eliminated from resistor network 184 which now contains resistors 248 and 254 and thermistor 256. With less resistance in resistor network 184, the duration of the duty cycle control signal output from control signal circuit 182 increases to increase power delivery to motor 74.

Still further depression of accelerator 318 moves sensing element 188 into the vicinity of transducer 312 to actuate it. Upon the actuation of transducer 312, transistor 266 activates through resistor 282 before transistor 264 deactivates. As a result, resistor 248 is eliminated from resistor network 184 which now contains resistor 254 and thermistor 256. The lessening of the resistance in resistor network 184 again increases the duration of the duty cycle control signal output from control signal circuit 182 to increase power delivery to motor 74.

An even further depression of accelerator 318 moves magnet 320 into the vicinity of transducer 314 to actuate it. Upon the actuation of transducer 314, transistor 269 activates through resistor 284 before transistor 266 deactivates. Consequently, resistor 254 is eliminated from resistor network 184 which now contains only thermistor 256. The even lower resistance in resistor network 184 increases the duration of the duty cycle control signal output from control signal circuit 182 to increase power delivery to motor 74.

Once accelerator 318 is fully depressed, magnet 320 actuates transducer 316 which, in turn, activates transistor 334 through resistor 332 and deactivates transistor 336. Transistor 336 switches off to eliminate the connection of capacitor 232 and pin TR of timer 238 to the supply voltage +V. Transistor 269 deactivates to open current path 185 so that resistor network 184 is no longer connected to timer 238. Transducer 316 biases transistor 334 on so that pin TR of timer 238 is coupled to the reference potential. With pin TR held at the reference potential, timer 238 outputs a constant high signal from pin OP to produce a 100% duty cycle control signal. Thus, transducer 304 when actuated produces a minimum duty cycle control signal, and transducer 316 when actuated produces a maximum duty cycle control signal, while transducers 306, 312, and 314 produce duty cycle control signals between the maximum and minimum values.

Alternatively, the release of accelerator 318 results in the reconnection of capacitor 232 and transistor 234 to timer 238. Additionally, a sequential reconnection of thermistor 256 and resistors 254, 248, and 246 to timer 238 occurs to decrease the duration of the duty cycle control signal output from control signal circuit 182. The complete release of accelerator 318 moves sensing element 188 away from transducers 304, 306, 312, 314, and 316, resulting in the deactivation of control signal circuit 182 to stop the output of the duty cycle control signal so that motor 74 switches off.

FIG. 4 illustrates a second alternative embodiment of transducer/resistor network 186 which connects to control signal circuit 182 to regulate timer 238. Timer 238, capacitor 232, resistor 236, and transistor 234 remain the same and operate as previously described to output a duty cycle control signal.

Transducers 400–405 are Hall effect components actuated to a conducting state by the presence of a magnetic field. When unactuated (i.e., magnet 320 (see FIG. 1A) is directed towards off area 415), the voltage on the terminal of transducer 405 floats, requiring the connection of resistor 412 to the output of transducer 405. Resistor 412 establishes the voltage at the output of transducers 405 at a high state to ensure transistor 413 remains off when transducer 405 is off. Transistors 413 remains off when a high signal is applied at its control terminal (i.e., its base) because, in this preferred embodiment, it is PNP bipolar junction transistor (BJT). Resistors at the outputs of transducers 400–404 are not required because the voltage applied to pin TR of timer 238 by capacitor 232 and the conducting/non-conducting state of pin DIS determine the output state for transducers 400–404.

An initial depression of accelerator 318 (see FIG. 1A) actuates transducer 400 so that capacitor 232 charges directly through transducer 400 and resistor network 414 formed by resistors 406–411. When capacitor 232 charges to the trigger threshold voltage, timer 238 outputs a high signal from pin OP as previously described. Further depression of accelerator 318 sequentially actuates transducers 401–404 to sequentially remove resistors 406409 from resistor network 414. By decreasing the resistance through which capacitor 232 charges, the time required for capacitor 232 to reach the trigger threshold voltage of timer 238 decreases. Consequently, the duration of the high signal output from pin OP of timer 238 increases.

Once an operator fully depresses accelerator 318, transducer 405 actuates, resulting in transistor 413 biasing on to remove resistor 410 from resistor network 414 so that only resistor 411 remains. Capacitor 232 charges through resistor 411 to produce a maximum duty cycle control signal output from timer 238. Transducer 405 requires transistor 413 because the current carrying capacity of the Hall effect device implementing transducer 405 is insufficient when only resistor 411 remains in resistor network 414. Alternatively, the release of accelerator 318 results in the sequential reconnection of resistors 406–410 in resistor network 414.

Figure 5:
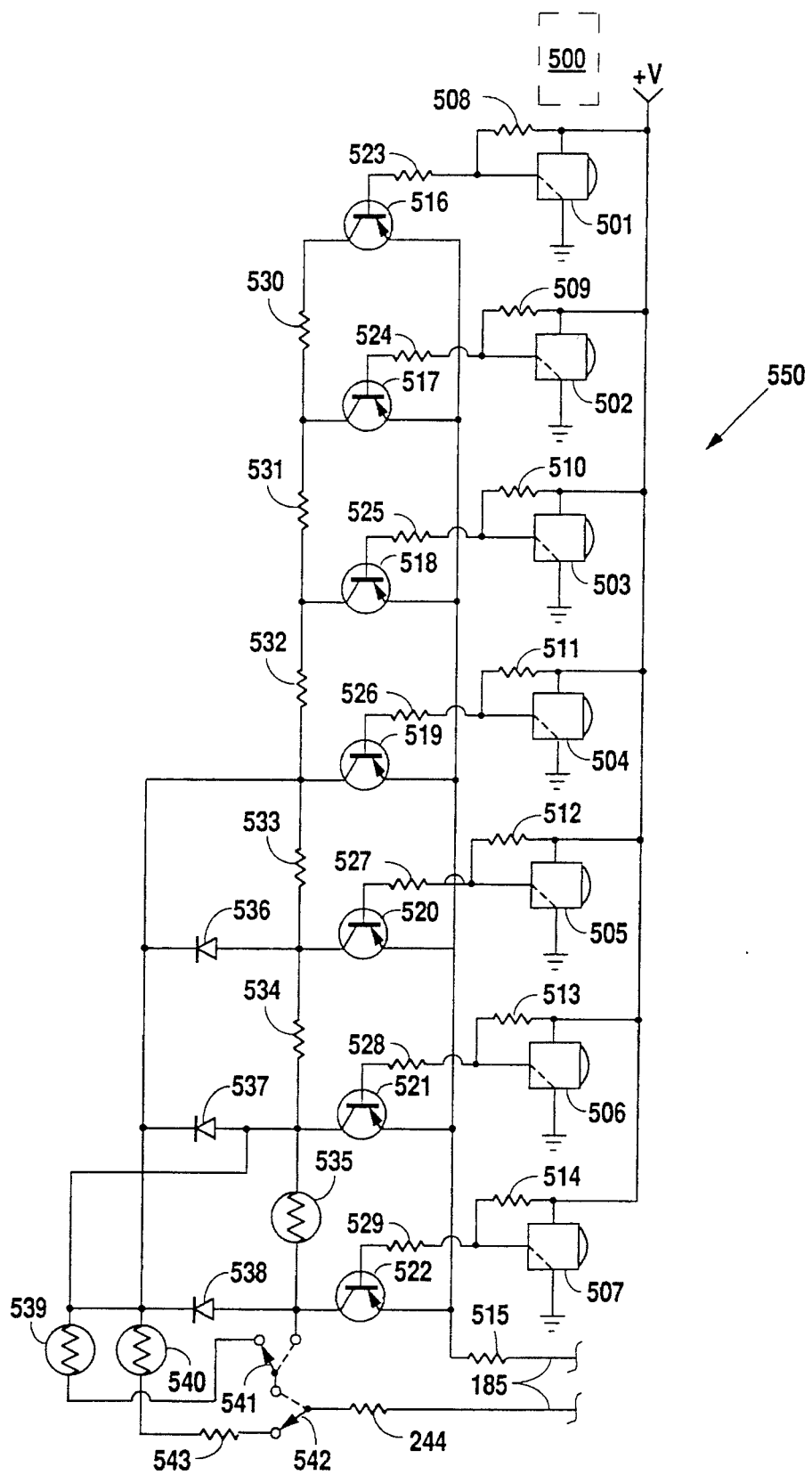
FIG. 5 is a schematic diagram illustrating a third alternative embodiment of the transducer/resistor network of the DC Motor Control System.

FIG. 5 illustrates a third alternative embodiment of transducer/resistor network 186 which includes a forward and reverse speed limiting circuit. The forward and reverse speed limiting circuit prevents control signal circuit 182 from outputting a 100% duty cycle control signal. Transducer/resistor network 550 connects to timer 238 the same as transducer/resistor network 186, except transducer/resistor network 550 includes switches 541 and 542 connected to pin DIS of timer 238. Timer 238, capacitor 232, resistor 236, and transistor 234 remain the same and operate as previously described to output the duty cycle control signal.

Transducers 501–507 are Hall effect components actuated to a conducting state by the presence of a magnetic field. Transducer/resistor network 550 includes transducers 506 and 507 to furnish resistor network 545 with additional resistance steps that result in smaller durational changes between duty cycle control signals so that smoother acceleration of motor 74 (see FIG. 1B) occurs.

When magnet 320 (see FIG. 1A) is directed towards off area 500, transducers 501–507 are at a distance sufficient to remove them from its influence. When transducers 501–507 are unactuated, the voltage on their terminals floats. Thus, transducer/resistor network 550 includes resistors 508–514 connected to transducers 501–507, respectively. Resistors 508–514 establish the voltage at the outputs of transducers 501–507 at a high state to ensure transistors 516–522 remain off when transducers 501–507 are also off. Transistors 516–522 remain off when a high signal is applied at their respective control terminals (i.e., their bases) because, in this preferred embodiment, they are PNP bipolar junction transistors (BJT's). Transducer/resistor network 550 includes resistors 523–529 connected to transistors 516–522, respectively, to limit the current applied across the input terminals of transistors 516–522.

Transducer/resistor network 550 includes resistor 543, diodes 536–538, and thermistors 539 and 540 to form the forward and reverse speed limiting circuit. Switches 541 and 542 connect to pin DIS of timer 238 to permit an operator to limit the speed of motor 74. The placement of switches 541 and 542 in the positions shown in outline in FIG. 5 will allow a 100% duty cycle control signal to be output by timer 235. In that instance, transducers 501–507 are actuated and deactuated sequentially to remove or add resistors 530–534 and thermistor 535 from resistor network 545 which also includes resistor 515. As previously described, the elimination or addition of resistance to the resistor network varies the duty cycle control signal output by timer 238.

To connect the forward and reverse speed limiting circuit, switch 541 is placed in the position indicated in full in FIG. 5 and switch 542 is connected to F/N/R switch 80 (see FIG. 1B) so that the position of F/N/R switch 80 determines the position of switch 542. Specifically, switch 542 resides in the position shown in outline when F/N/R switch 80 resides in its forward or neutral position, and switch 542 resides in the position shown in full when F/N/R switch 80 resides in its reverse position.

The placement of switch 541 in the position indicated in full and F/N/R switch 80 in either forward or neutral substitutes thermistor 539 for thermistor 535. Thermistor 539 has exactly the same resistance value as thermistor 535, however, thermistor 539 is never eliminated from resistor network 545. An initial depression of accelerator 318 (see FIG. 1A) actuates transducer 501 and, thus, transistor 516 to couple resistor network 545 to timer 238 with resistors 515 and 530–534 and thermistor 539 connected. The sequential activation of transducers 501–506 eliminates resistors 530–534 from resistor network 545 so that only resistor 515 and thermistor 539 remain.

An operator cannot accelerate motor 74 to its maximum speed because, even after the complete depression of accelerator 318 actuates transducer 507, thermistor 539 remains connected to timer 238 along with resistor 515. Thermistor 539 remains connected in resistor network 545 because transistor 522 biases on to complete the current path from pin TR of timer 238 to pin DIS of timer 238 which includes diode 538, thermistor 539, and resistor 515. Accordingly, with thermistor 539 remaining in resistor network 545, the resistance of resistor network 545 will never diminish to a value that permits timer 238 to output a 100% duty cycle control signal. Consequently, motor 74 never receives full power and, therefore, never accelerates to full speed.

The limiting of the reverse speed of motor 74 occurs as long as switch 542 remains connected to F/N/R switch 80. When F/N/R switch 80 resides in its reverse position, switch 542 resides in the position shown in full in FIG. 5. The placement of switch 541 does not affect whether the reverse speed of motor 74 is limited; thus, its position is inconsequential.

The placement of switch 542 in the position indicated in full substitutes thermistor 540 and resistor 543 for thermistor 535 and resistors 533 and 534, respectively. Thermistor 540 has exactly the same resistance value as thermistor 535, however, thermistor 540 is never eliminated from resistor network 545. Similarly, the resistance value of resistor 543 equals the sum of the resistance values for resistors 533 and 534, however, resistor 543 is never eliminated from resistor network 545.

An initial depression of accelerator 318 (see FIG. 1A) actuates transducer 501 and, thus, transistor 516 to couple resistor network 545 to timer 238 with resistors 515, 530–532, and 543 and thermistor 540 connected. The sequential activation of transducers 501–504 eliminates resistors 530–532 from resistor network 545 so that only resistors 515 and 543 and thermistor 540 remain. Continued depression of accelerator 318 sequentially actuates transducers 505 and 506 until a full depression of accelerator 318 actuates transducer 507. With one of transducers 505–507 actuated its corresponding transistor 520–522 biases on to complete the current path from pin TR of timer 238 to pin DIS of timer 238 which includes resistors 515 and 543, thermistor 540, and one of diodes 536–538. Accordingly, an operator cannot accelerate motor 74 to its maximum speed because, with resistor 543 and thermistor 540 always remaining in resistor network 545, the resistance of resistor network 545 will never diminish to a value that permits timer 238 to output a 100% duty cycle control signal. Consequently, motor 74 never receives full power and, therefore, never accelerates to full speed.

The forward and reverse speed limiting circuit includes diodes 536–538 to prevent current flow to transistors 520–522 when one of transistors 516–521 are biased on. Additionally, although a current path from resistors 533 and 534 and thermistor 535 to thermistor 540 and resistor 543 exists via diode 538, any current flow produced is negligible and does not interfere with the proper operation of the forward and reverse speed limiting circuit when it limits reverse motor speed. If switch 542 were eliminated, both forward and reverse speed would still be limited, however, if switch 541 were eliminated, only reverse speed would be limited.

Figure 6:
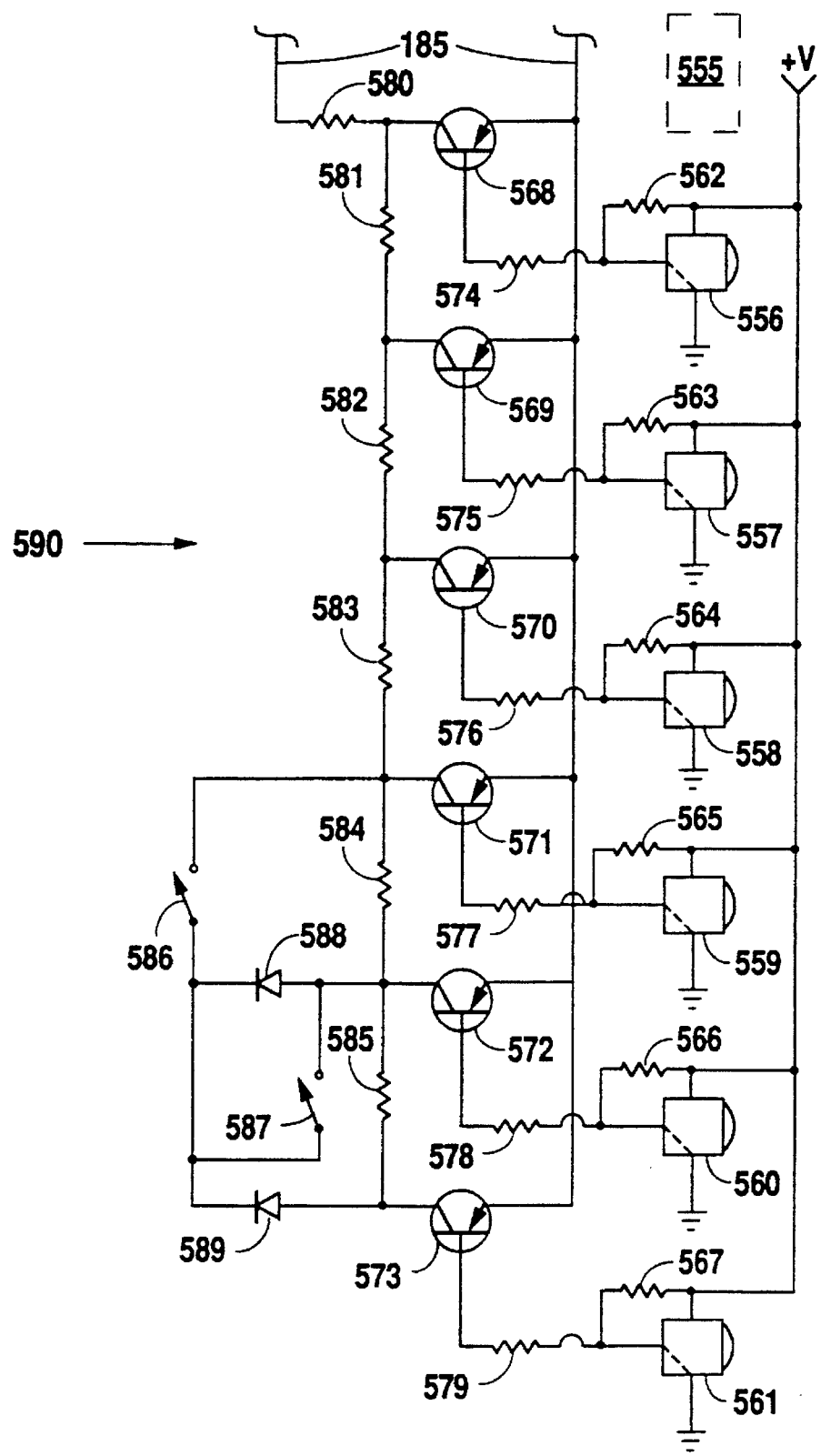
FIG. 6 is a schematic diagram illustrating a fourth alternative embodiment of the transducer/resistor network of the DC Motor Control System.

FIG. 6 illustrates a fourth alternative embodiment of transducer/resistor network 186 which is utilized in DC Motor Control Systems requiring an increasing resistance to produce increases in motor speed. Transducer/resistor network 590 includes a forward and reverse speed limiting circuit to prevent the outputting of a 100% duty cycle control signal to the motor.

Transducers 556–561 are Hall effect components actuated to a conducting state by the presence of a magnetic field. When a magnet of a sensing element (see FIG. 1A) is directed towards off area 555, transducers 556–561 are at a distance sufficient to remove them from its influence. When transducers 556–561 are unactuated, the voltage on their terminals floats. Thus, transducer/resistor network 590 includes resistors 562–567 connected to transducers 556–561, respectively. Resistors 562–567 establish the voltage at the outputs of transducers 556–561 at a high state to ensure transistors 568–573 remain off when transducers 556–561 are also off. Transistors 568–573 remain off when a high signal is applied at their respective control terminals (i.e., their bases) because, in this preferred embodiment, they are PNP bipolar junction transistors (BJT's). Transducer/resistor network 550 includes resistors 574–579 connected to transistors 568–573, respectively, to limit the current applied across the control terminals of transistor 568–573.

Transducer/resistor network 550 includes switches 586 and 587 and diodes 588 and 589 to form the forward and reverse speed limiting circuit. With switches 586 and 587 open, transducer/resistor network 550 produces a 100% duty cycle control signal for application to the motor. In that instance, an accelerator and sensed element sequentially actuate transducers 556–561 to add resistors 581–585 to resistor network 589 which also includes resistor 530. That addition of resistance to resistor network 589 increases the duty cycle control signal output from 0% to 100%.

Conversely, to slow the motor, the accelerator is released so that the sensing element sequentially actuate transducers 556–561 in reverse to eliminate resistors 581–585 from resistor network 589. That elimination of resistance from resistor network 589 decreases the duty cycle control signal output towards 0%. Once the sensing element reaches off area 555, no duty cycle control signal is applied to the motor.

To connect the forward and reverse speed limiting circuit, switch 587 is closed and switch 586 is connected to the F/N/R switch (see FIG. 1B) so that the position of the F/N/R switch determines the position of switch 586. Specifically, switch 586 opens when the F/N/R switch resides in its forward or neutral position, and switch 586 closes when the F/N/R switch resides in its reverse position.

The closing of switch 587 and the placement of F/N/R switch 80 in either it forward or neutral position permits the bypassing of resistor 585 via diode 588. An initial depression of the accelerator actuates transducer 556 and, thus, transistor 568 to couple resistor 530 of resistor network 589 to the circuit for outputting the duty cycle control signal. The sequential activation of transducers 557–560 adds resistors 581–584 to resistor network 589.

An operator cannot accelerate motor 74 to its maximum speed because, even after the complete depression of the accelerator actuates transducer 561, resistor 585 is not connected to the circuit for outputting the duty cycle control signal. Resistor 585 is not because, with switch 587 closed, resistor 585 is bypassed via diode 589. Accordingly, the resistance of resistor network 589 never increases to a value that permits the output of a 100% duty cycle control signal. Consequently, the motor never receives full power and, therefore, never accelerates to full speed.

The limiting of the reverse speed of the motor occurs as long as switch 586 remains connected to the F/N/R switch. Switch 586 closes when the F/N/R switch resides in its reverse position. The closing or opening of switch 587 does not affect whether the reverse speed of the motor is limited; thus, its position is inconsequential.

The closing of switch 586 allows the bypassing of resistors 584 and 585. An initial depression of the accelerator actuates transducer 556 and, thus, transistor 568 to couple resistor 530 of resistor network 589 to the circuit for outputting the duty cycle control signal. The sequential activation of transducers 557–559 adds resistors 581–583 to resistor network 589. Continued depression of the accelerator actuates transducer 560 until a full depression of the accelerator actuates transducer 561. With transducer 560 actuated, transistor 572 biases on, however, resistor 584 is bypassed via diode 588. Similarly, with transducer 561 actuated, transistor 573 biases on, however, resistor 585 is bypassed via diode 589. Accordingly, an operator cannot accelerate the motor to its maximum speed because, with either resistor 584 or both resistors 584 and 585 bypassed, the resistance of resistor network 545 never increases to a value that permits the output of a 100% duty cycle control signal. Consequently, the motor never receives full power and, therefore, never accelerates to full speed.

The forward and reverse speed limiting circuit includes diode 588 to prevent current flow to transistor 572 when transistor 573 is biased on. The forward and reverse speed limiting circuit includes diode 589 to prevent speed reduction when transducer 560 is actuated and transducer 561 is unactuated because, without diode 589, the impedance of diode 588 would be eliminated from resistor network 589. Additionally, if switch 586 were eliminated, both forward and reverse speed would still be limited, however, if switch 587 were eliminated, only reverse speed would be limited.

Figure 7:
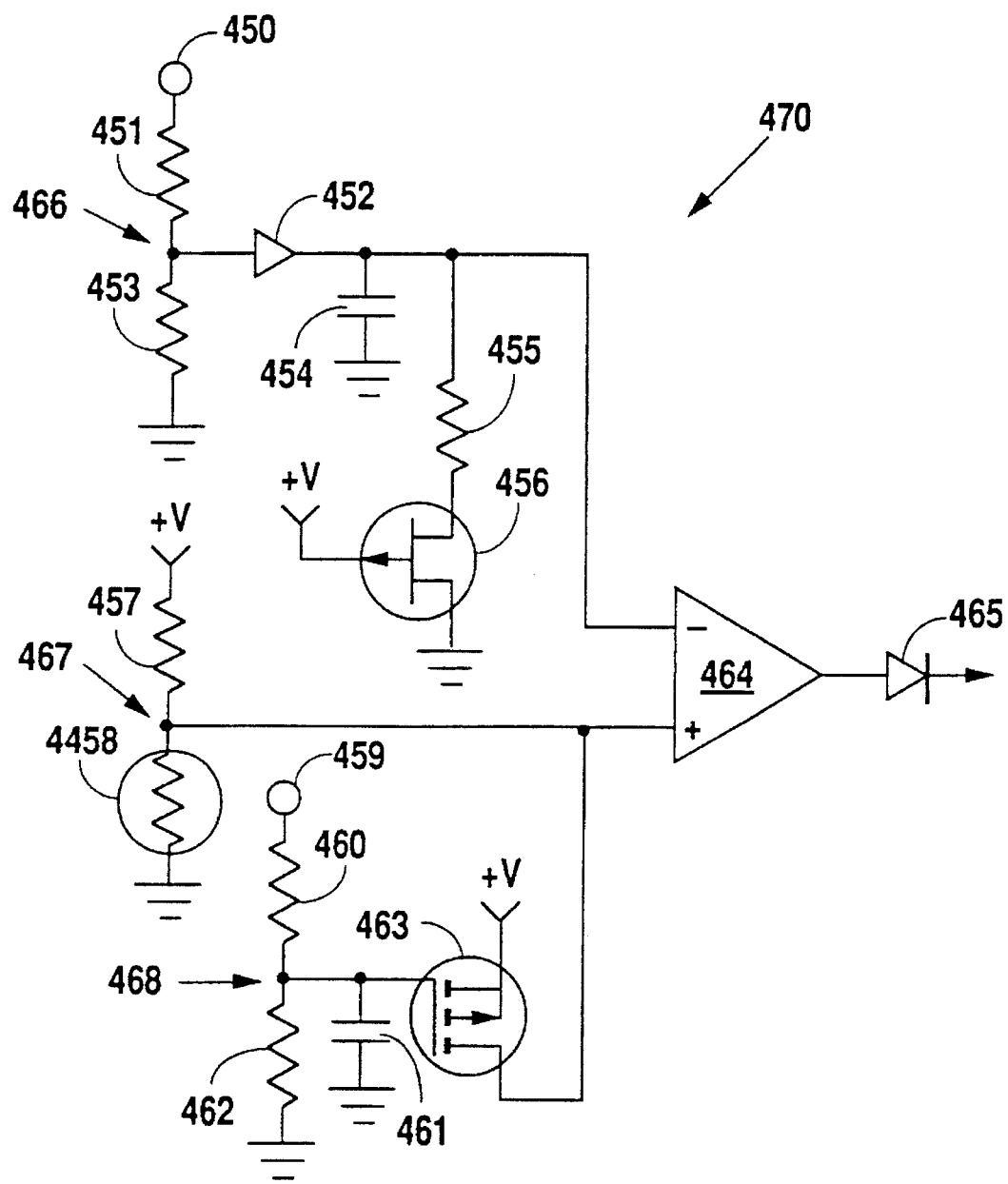
FIG. 7 is a schematic diagram illustrating an alternative embodiment for the operational safety and start safety circuits of the DC Motor Control System.

As illustrated in FIG. 7, an alternative operational and start safety circuit 470 combining both operational safety circuit 22 and start safety circuit 183 prevents abuse of the DC Motor Control System, motor 74, and the battery or bank of batteries supplying power to motor 74 (see FIGS. 1A and B). However, operational and start safety circuit 470 differs from operational safety circuit 22 and start safety circuit 183 in that it ensures limit circuit 181 always controls the maximum acceleration rate of motor 74 when it is begun from a completely stopped position.

Terminal 450 of operational and start safety circuit 470 connects to busbar 164, while the output from amplifier 464 connects to the second input of gate driver amplifier 237 of limit circuit 181 (see FIG. 1A). Operational and start safety circuit 470 includes diode 465 to prevent amplifier 464 from sinking high signals developed by braking circuit 22 and current limiting circuit 26 when amplifier 464 outputs a low signal. Resistor 56 remains to provide a low input to limit circuit 181 as previously described.

Voltage divider 466 formed by resistors 451 and 453 reduces the battery voltage +B before supplying it across the inverting input of amplifier 464. The output from voltage divider 466 connects to the inverting input of amplifier 464 via diode 452, while capacitor 454 connects in parallel with that output. Diode 452 and capacitor 454 condition the voltage delivered to the inverting input of amplifier 464 to maintain the reduced voltage applied across the inverting input of amplifier 464 at a stable percentage of the battery voltage +B.

Similarly, voltage divider 467 formed by resistor 457 and thermistor 458 reduces the supply voltage +V furnished to the non-inverting input of amplifier 464. During normal operation (i.e., the battery or bank of batteries are well charged and motor 74 is operating within an acceptable temperature range), the voltage applied to the inverting input of amplifier 464 is higher than the voltage applied to the non-inverting input of amplifier 464. Consequently, amplifier 464 outputs a low signal to limit circuit 181 via cable 37, resulting in limit circuit 181 remaining off so that normal operation of motor 74 occurs.

However, upon the initial application of power to the DC Motor Control System followed by the depression of accelerator 318 (see FIG. 1A), capacitor 454 ensures that limit circuit 181 controls the delivery of power to motor 74. That is, as capacitor 454 charges upon the application of power, its sinks the output from voltage divider 466 which otherwise would be applied at the inverting input of amplifier 464. Consequently, amplifier 464 receives a larger input at its non-inverting input than at its inverting input. In response, amplifier 464 outputs a high signal to activate limit circuit 181 so that it controls power delivery to motor 74 as previously described. Amplifier 464 outputs a high signal until capacitor 454 charges to a higher voltage level than that produced by voltage divider 467, whereupon, the inverting output receives a larger input than the non-inverting input, resulting in a low output from amplifier 464.

During low speed operation of motor 74, the operator often momentarily releases accelerator 318 to maintain the speed of motor 74. Upon the release of accelerator 318, all voltage (i.e., battery voltage +B and supply voltage +V) is removed from operational and start safety circuit 470, resulting in the discharge of capacitor 454. If capacitor 454 discharged to a level below the supply voltage +V, amplifier 464 would output a high signal to limit circuit 181 because, as capacitor 454 recharged in response to the redepression of accelerator 318, it would sink the output of voltage divider 466 as previously described.

Thus, operational and start safety circuit 470 includes diode 452, resistor 455, and transistor 456 to prevent the accidental activation of limit circuit 181 during low speed operation of motor 74 by limiting the discharge rate of capacitor 454. Transistor 456 is a p-channel enhancement mode JFET having an input terminal connected to capacitor 454 via resistor 455, and output terminal connected to the reference potential, and a control terminal connected to the supply voltage +V.

When an operator depresses accelerator 318, the supply voltage +V is applied across the control terminal of transistor 456 to bias it off. Conversely, when the operator releases accelerator 318, transistor 456 biases on in response to the low signal applied at its control terminal. With transistor 456 biased on, capacitor 454 is connected to the reference potential, resulting in it discharging. However, the resistance value of resistor 455 produces an extremely slow discharge rate of capacitor 454 to the reference potential so that momentary releases of accelerator 318 will not cause the unwanted activation of limit circuit 181.

As the battery or bank of batteries powering motor 74 discharge, the magnitude of the voltage applied to the inverting input of amplifier 464 by voltage divider 466 diminishes accordingly. When the battery voltage +B drops to a preselected battery discharge level, the voltage applied to the inverting input of amplifier 464 falls to a level below the voltage applied to the non-inverting input of amplifier 464 by voltage divider 467. In response, amplifier 464 outputs a high signal to limit circuit 181 via cable 37, thereby activating limit circuit 181. The voltage level at which the non-inverting input exceeds the inverting input into amplifier 464 (i.e., the preselected battery discharge level) is determined through the selection of resistance values for resistors 451, 453, and 457 and the value of thermistor 458.

Operational and start safety circuit 470 includes thermistor 458 to prevent excessive temperatures from damaging motor 74 and the DC Motor Control System. Because thermistor 458 is a temperature sensitive device, its resistance increases as the temperature of power control unit 10 increases (see FIG. 1B). Thus, as the resistance of thermistor 458 increases, the magnitude of the voltage applied to the non-inverting input of amplifier 464 increases. When the temperature of the DC Motor Control System reaches a level where component damage may occur, thermistor 458 reaches a resistance value that produces a voltage across the non-inverting input of amplifier 464 which is greater than the voltage across the inverting input of amplifier 464. Consequently, amplifier 464 outputs a high signal to limit circuit 181, resulting in the activation of limit circuit 181. The temperature at which amplifier 464 outputs a high signal to limit circuit 181 is determined through the selection of the value for thermistor 458.

During normal operation, an operator first closes F/N/R switch 80 and then depresses accelerator 318 to permit the delivery of power to motor 74 (FIGS. 1A and B). However, if the operator attempts to start motor 74 with accelerator 318 depressed before closing F/N/R switch 80, limit circuit 181 must be activated to control power delivery to motor 74 so that damage to motor 74 and the device driven by motor 74 as well as possible injury to the operator may be prevented. Furthermore, if the operator waits for capacitor 454 to charge and limit circuit 181 to time out (i.e., capacitor 235 discharges) before closing F/N/R switch 80, limit circuit 181 must be reactivated to prevent the above-described consequences.

Terminal 459 connects to busbar 166 to apply voltage across voltage divider 468 formed by resistors 460 and 462. Voltage divider 468 reduces the voltage applied across transistor 463. In this preferred embodiment, transistor 463 is a p-channel enhancement mode MOSFET having an input terminal connected to the supply voltage +V, an output terminal connected to the non-inverting input of amplifier 464, and a control terminal connected to the output from voltage divider 468. Capacitor 461 connects in parallel with the output from voltage divider 468 to condition the voltage output from voltage divider 468.

Under normal operation of motor 74 (i.e., F/N/R switch 80 closed before the depression of accelerator 318), voltage divider 468 applies voltage across the control terminal of transistor 463 which biases it off. However, with F/N/R switch 80 open and power applied to switch network 30 due to the depression of accelerator 318, busbar 166 receives no voltage. Consequently, voltage divider 468 outputs no voltage to the control terminal of transistor 463 and, instead, couples the control terminal of transistor 463 to the reference potential through both resistors 460 and 462. With the control terminal of transistor 463 coupled to the reference potential, transistor 463 activates to apply the supply voltage +V to the non-inverting input of amplifier 464. With the supply voltage +V applied at the non-inverting input of amplifier 464, amplifier 464 outputs a high signal to limit circuit 181 via cable 37, thereby activating it. Once activated limit circuit 181 controls the maximum acceleration rate of motor 74.

Although the preferred embodiment discloses a control circuit for direct current devices, one skilled in the art will readily recognize that the DC Motor Control System may be modified to control alternating current (ac) devices. Specifically, different value capacitors and resistors, which would revise the pulse width to the desired frequency, could be substituted for the capacitors and resistors of the preferred embodiment. Additionally, a triac network must be substituted for switch network 30. Thus, with the correct pulse frequency and the triac network, the Motor Control System will control ac devices.

From the foregoing description and illustration of this invention, it is apparent that various modifications can be made by reconfigurations or combinations to produce similar results. It is, therefore, the desire of the Applicant not to be bound by the description of this invention as contained in this specification, but to be bound by the claims as appended hereto.

We claim:

1. An apparatus for receiving an operator input and translating the operator input into a resistance value utilized to regulated a speed control device, comprising:

a plurality of transducers each including an input terminal connected to a supply voltage and an output terminal;

means responsive to said operator input for actuating at least one of said plurality of transducers;

a plurality of parallel connected switches each including a control terminal connected to the output terminal of one of said plurality of transducers, a first terminal connected to said speed control device, and a second terminal; and a resistive network connected to said speed control device, said resistive network comprising a plurality of series connected resistive devices wherein each one of said resistive devices connects between a second terminal of said plurality of parallel connected switches.

2. The apparatus according to claim 1 wherein said plurality of parallel connected switches each comprises a transistor.

* * * * *